(12) United States Patent
Sharma et al.

(10) Patent No.: US 12,149,922 B2
(45) Date of Patent: *Nov. 19, 2024

(54) COMMUNICATIONS DEVICE, INFRASTRUCTURE EQUIPMENT, WIRELESS COMMUNICATIONS NETWORK AND METHODS

(71) Applicant: Sony Group Corporation, Tokyo (JP)

(72) Inventors: Vivek Sharma, Basingstoke (GB); Brian Alexander Martin, Basingstoke (GB); Hideji Wakabayashi, Basingstoke (GB); Shinichiro Tsuda, Basingstoke (GB)

(73) Assignee: SONY GROUP CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/358,043

(22) Filed: Jul. 25, 2023

(65) Prior Publication Data

US 2023/0370930 A1 Nov. 16, 2023

Related U.S. Application Data

(63) Continuation of application No. 17/315,356, filed on May 10, 2021, now Pat. No. 11,743,796, which is a
(Continued)

(30) Foreign Application Priority Data

May 5, 2017 (EP) ..................... 17169832

(51) Int. Cl.
*H04W 28/02* (2009.01)
*H04W 28/24* (2009.01)
(Continued)

(52) U.S. Cl.
CPC ....... *H04W 28/0268* (2013.01); *H04W 28/24* (2013.01); *H04W 36/0027* (2013.01);
(Continued)

(58) Field of Classification Search
CPC . H04W 36/28; H04W 28/0268; H04W 28/24; H04W 36/0027; H04W 36/0044;
(Continued)

(56) References Cited

U.S. PATENT DOCUMENTS 8,514,809 B2 8/2013 Hwang et al.
9,521,590 B2 12/2016 Keller et al.
(Continued)

FOREIGN PATENT DOCUMENTS

CN 1802009 A 7/2006
CN 101019460 A 8/2007
(Continued)

OTHER PUBLICATIONS

Lera, A., et al. "End-to-end QoS provisioning in 4G with mobile hotspots." IEEE network 19.5 (2005): 26-34. (Year: 2005).*
(Continued)

*Primary Examiner* — Sharad Rampuria
(74) *Attorney, Agent, or Firm* — XSENSUS LLP

(57) ABSTRACT

A method is performed in a first infrastructure equipment for a handover of a wireless device from the first infrastructure equipment as a source to a second infrastructure equipment as a target. The method comprises maintaining a mapping between a plurality of packet bearers and a data radio bearer for the wireless device, each of the plurality of packet bearers being configured to provide a specified quality of service, determining that the wireless device should handover from the first infrastructure equipment to the second infrastructure equipment, determining that the second infrastructure equipment does not support the mapping of the
(Continued)

plurality of packet bearers to the data radio bearer, and providing an indication of a mapping of the plurality of packet bearers for the second infrastructure equipment after handover to one of a core network equipment and the second infrastructure equipment.

14 Claims, 10 Drawing Sheets

Related U.S. Application Data continuation of application No. 16/610,528, filed as application No. PCT/EP2018/060754 on Apr. 26, 2018, now Pat. No. 11,012,910.

(51) Int. Cl.
| | |
|---|---|
| *H04W 36/00* | (2009.01) |
| *H04W 36/02* | (2009.01) |
| *H04W 36/08* | (2009.01) |
| *H04W 36/28* | (2009.01) |
| *H04W 80/08* | (2009.01) |

(52) U.S. Cl.
CPC ... *H04W 36/0044* (2013.01); *H04W 36/0077* (2013.01); *H04W 36/02* (2013.01); *H04W 36/08* (2013.01); *H04W 36/28* (2013.01); *H04W 80/08* (2013.01)

(58) Field of Classification Search
CPC . H04W 36/0077; H04W 36/02; H04W 36/08; H04W 36/165; H04W 80/08; H04W 36/0005; H04W 36/00; H04W 36/0007; H04W 36/0009; H04W 36/0016; H04W 36/03; H04B 7/18541; H04L 47/767
See application file for complete search history.

(56) References Cited

U.S. PATENT DOCUMENTS

| | | | |
|---|---|---|---|
| 11,012,910 B2 | 5/2021 | Sharma et al. | |
| 11,153,788 B2 | 10/2021 | Park et al. | |
| 2008/0025263 A1* | 1/2008 | Pelkonen | H04W 36/0066 370/332 |
| 2009/0201884 A1 | 8/2009 | Chaponniere | |
| 2013/0003599 A1* | 1/2013 | Zakrzewski | H04W 48/18 370/328 |
| 2014/0078898 A1* | 3/2014 | Anchan | H04W 36/0066 370/230 |
| 2015/0003435 A1 | 1/2015 | Horn et al. | |
| 2015/0223117 A1 | 8/2015 | Jha | |
| 2018/0124656 A1* | 5/2018 | Park | H04W 36/36 |
| 2018/0160348 A1 | 6/2018 | Wu | |
| 2018/0220327 A1 | 8/2018 | Karampatsis et al. | |
| 2018/0234903 A1* | 8/2018 | Jheng | H04W 36/0066 |
| 2020/0128452 A1* | 4/2020 | Centonza | H04W 36/0044 |

FOREIGN PATENT DOCUMENTS

| | | |
|---|---|---|
| CN | 101448295 A | 6/2009 |
| CN | 103702364 A | 4/2014 |
| CN | 104219722 A | 12/2014 |
| CN | 104255056 A | 12/2014 |
| CN | 104303582 A | 1/2015 |
| CN | 105228263 A | 1/2016 |
| CN | 105917702 A | 8/2016 |
| CN | 105992293 A | 10/2016 |
| JP | 2013-514022 A | 4/2013 |
| KR | 20100085147 A | 7/2010 |
| KR | 20100113636 A | 10/2010 |
| KR | 20120005508 A | 1/2012 |
| KR | 20120046283 A | 5/2012 |
| KR | 20160002150 A | 1/2016 |
| WO | 2018/130968 A1 | 7/2018 |

OTHER PUBLICATIONS

"Digital cellular telecommunications system (Phase 2+)", Mobile Station (MS) conformance specification, Part 1: Conformance specification, 3GPP TS 51.010-1, version 4.9.0 Release 4, ETSI TS 151 010-1, v4.9.0, Jul. 2002, Sophia Antipolis Cedex, France.
International Search Report and Written Opinion mailed on Aug. 29, 2018 for PCT/EP2018/060754 filed on Apr. 26, 2018, 16 pages.
New Work Item on LTE Connectivity to 5G-CN, 3GPP TSG RAN Meeting #75, Huawei, Ericsson, Dubrovnik, Croatia, Mar. 6-9, 2017—RP-170840, 7 pages.
Inter-system Intra-RAT Mobility, 3GPP TSG-RAN WG2 #97, Athens, Greece, Feb. 13-17, 2017, R2-1701949, 4 pages.
Holma et al., LTE for UMTS OFDMA and SC-FDMA Based Radio Access, Wiley 2009, 4 pages.
ETSI TS 136 331 V13.0.0 (Jan. 2016); LTE; Evolved Universal Terrestrial Radio Access (E-UTRA); Radio Resource Control (RRC); Protocol Specification 3GPP TS 36.331 version 13.0.0 Release 13), 670 pages.
ETSI TS 138 300 V15.3.1 (Oct. 2018) 5G; NR; Overall Description; Stage 2 (3GPP TS 38.300 version 15.3.1 Release 15), 90 pages.
Hirschman et al., "High-performance evolved packet core signaling and bearer processing on general-purpose processors", IEEE Network 29.3, 2015, pp. 6-14.
Huawei et al., "Discussion on NR-LTE handover under 5GCN", 3GPP TSG-RAN WG2 #97BIS, R2-1703383, 4 pages. Apr. 3, 2017.
Huawei, "Lossless HO of QoS flow", 3GPP TSG-RAN2 Meeting #97bis, R2-1702615, 5 pages. Apr. 3, 2017.
Intel Corporation, "Report of email discussion: [96#34] [NR] Inter-RAT mobility", 3GPP TSG-RAN WG2 NR Adhoc Meeting, R2-1700320, 32 pages. Jan. 24, 2017.
R3-170039 "QoS impaction on handover procedure": Jan. 12, 2017, CATT, pp. 1-4.
R3-170253 "Flow based QoS during Handover": Jan. 12, 2017, Huawei, pp. 1-4.
"Journal of Jilin University (Information Science Edition)", vol. 24, No. 6 Effective QoS Management Method with Service Differentiation for WCDMA Networks, Bura Aman et al., pp. 1-8. Nov. 2006.
Te, ZTE Microelectronics , Consideration on the inter-RAT mobility, 3GPP TSG RAN WG2 adhoc_2017_01_NR R2-1700165, 3GPP, Jan. 7, 2017.
"Digital cellular telecommunications system (Phase 2+)", Mobile Station (MS) conformance specification, Part 1: Conformance specification, 3GPP TS 51.010-1, version 4.9.0 Release 4, ETSI TS 151 010-1, v4.9.0, 2002-07, Sophia Antipolis Cedex, France.
Ericsson, "Lossless intra-system handover with 5G-CN", 3GPP TSG-RAN WG3 #97-bis, Tdoc R3-171148, Apr. 3-7, 2017, Spokane, USA.
Samsung, "Data Forwarding in Handover", 3GPP TSG-RAN WG3 #95bis, R3-171046, Apr. 3-7, 2017, Spokane, USA.
Taaghol, Pouya, Apostolis K. Salkintzis, and Jay Iyer. "Seamless integration of mobile WiMAX in 3GPP networks." IEEE Communications Magazine 46.10 (2008): 7 4-85. (Year: 2008).
Ramjee, Ramachandran, et al. "Hawaii: A domain-based approach for supporting mobility in wide-area wireless networks." IEEE/ACM Transactions on networking 10.3 (2002): 396-410. (Year: 2002).

* cited by examiner

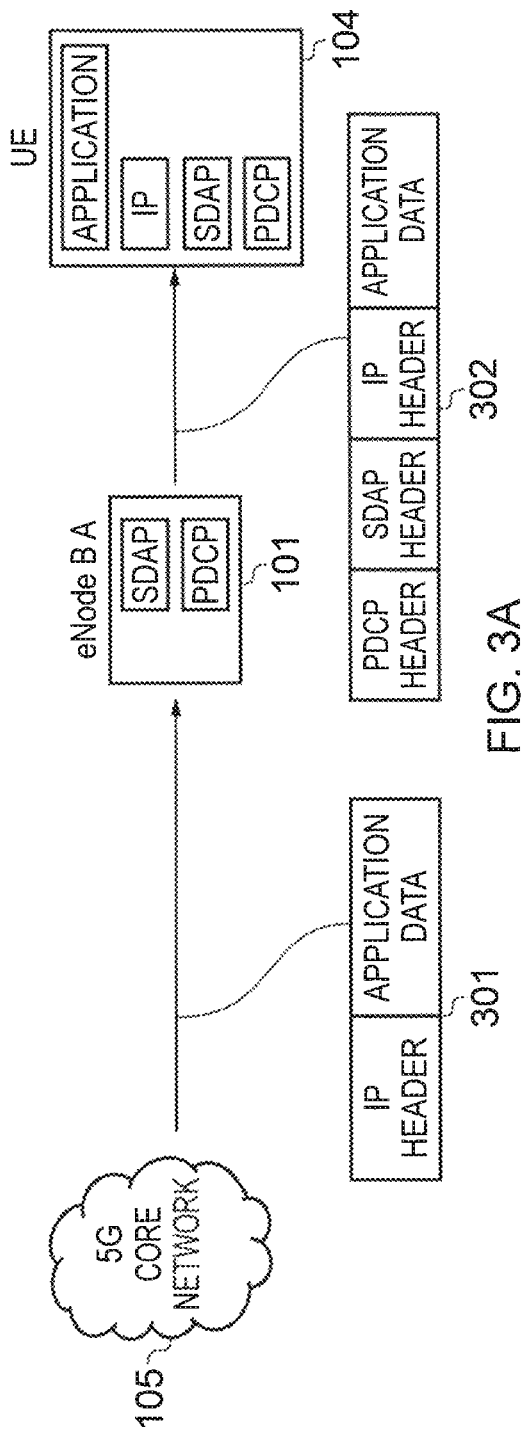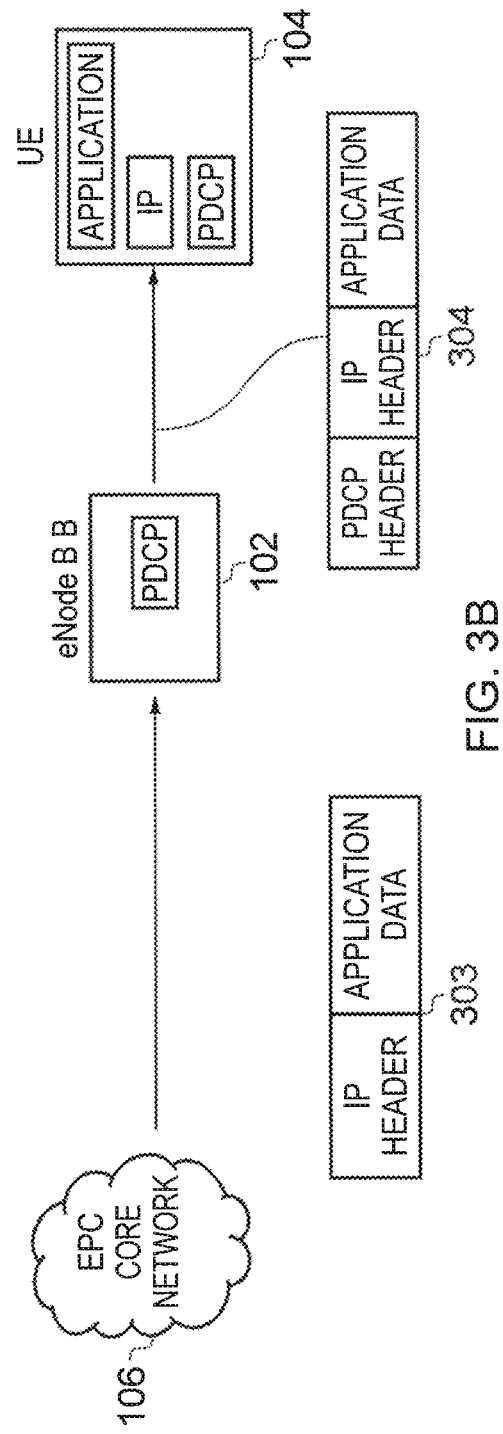
FIG. 3A
FIG. 3B

COMMUNICATIONS DEVICE, INFRASTRUCTURE EQUIPMENT, WIRELESS COMMUNICATIONS NETWORK AND METHODS

CROSS-REFERENCE TO RELATED APPLICATIONS

The present application is a continuation of U.S. application Ser. No. 17/315,356, filed May 10, 2021, which is a continuation of U.S. application Ser. No. 16/610,528, filed Nov. 4, 2019 (now U.S. Pat. No. 11,012,910), which is based on PCT filing PCT/EP2018/060754, filed Apr. 26, 2018, which claims priority to EP 17169832.7, filed May 5, 2017, the entire contents of each are incorporated herein by reference.

BACKGROUND

Field of Disclosure

The present disclosure relates to wireless communications devices and infrastructure equipment configured to perform a handover of a wireless communications device in a wireless communications network, and methods of performing a handover.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present technique.

Fourth generation mobile communication networks are able to support sophisticated services that demand high bandwidth and low latency data transmission. Efforts are now being targeted at a new technology that will further increase the range of services that can be delivered to wireless communication devices. It is expected that this new technology will be based on a new core network architecture. Radio access equipment that operates according to a fourth generation radio technology (LTE) may be able to connect to a core network operating according to the new architecture.

However, given the wide spread deployment of fourth generation networks and their associated enhanced packet core, EPC, core networks, there is a desire that wireless communications devices are able to obtain service from both types of networks; furthermore it is desirable that seamless mobility (i.e. handover) is possible between the types of network.

SUMMARY OF THE DISCLOSURE

According to one example embodiment of the present technique, there is provided a method performed in a first infrastructure equipment for a handover of a wireless communications device from the first infrastructure equipment as a source to a second infrastructure equipment as a target. The method comprises maintaining a mapping between a plurality of packet bearers and a data radio bearer for the wireless communications device, each of the plurality of packet bearers being configured to provide a specified quality of service, determining that the wireless communications device should handover from the first infrastructure equipment to the second infrastructure equipment, determining that the second infrastructure equipment does not support the mapping of the plurality of packet bearers to the data radio bearer, and providing an indication of a mapping of the plurality of packet bearers for the second infrastructure equipment after handover to one of a core network equipment and the second infrastructure equipment for configuration of at least one of the radio bearer and the plurality of packet bearers at the second infrastructure equipment after the handover. As a result handover can be performed when the second infrastructure equipment does not support the mapping of a plurality of packet bearers to a data radio bearer. Further respective aspects and features are defined by the appended claims.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein:

FIGS. 3A and 3B illustrate example protocols and protocol data units used for transmissions over the logical channels illustrated in FIGS. 2A and 2B respectively;

DETAILED DESCRIPTION OF THE EMBODIMENTS

Conventional Communications System

Figure 1:
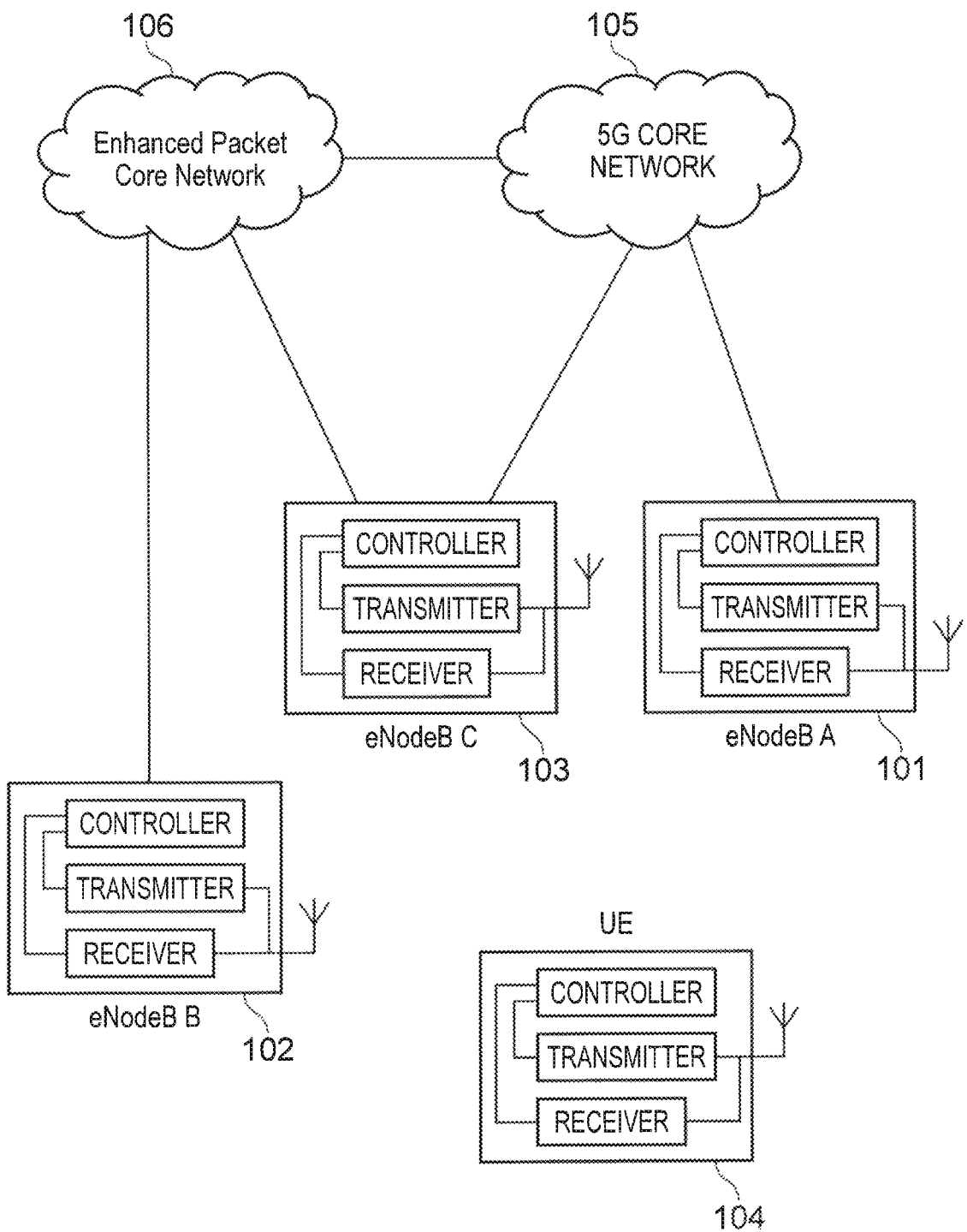
FIG. 1 is a schematic block diagram illustrating an example of a mobile telecommunication system including eNBs connected to a 5G core network and/or an enhanced packet core network.

FIG. 1 provides a schematic diagram illustrating some basic functionality of a mobile telecommunications network/system which may be adapted to implement embodiments of the disclosure as described further below. Various elements of FIG. 1 and their respective modes of operation are well-known and defined in the relevant standards administered by the 3GPP® body, and also described in many books on the subject, for example, Holma H. and Toskala A [1]. It will be appreciated that operational aspects of the telecommunications network which are not specifically described below may be implemented in accordance with any known techniques, for example according to the relevant standards.

The network includes a plurality of base stations 101, 102, 103 connected to two core networks 105 and 106. Each of the base stations provides one or more coverage areas (i.e. cells) within which data can be communicated to and from a communications device 104. Data is transmitted from the base stations 101, 102, 103 to communications devices such as the communications device 104 within their respective coverage areas via a radio downlink Data is transmitted from communications device such as the device 104 to the base stations via a radio interface which provides a radio uplink and a radio downlink. The uplink and downlink communications may be made using radio resources that are licenced for exclusive use by an operator of the network. The core networks 105 and 106 route data to and from the communications device 104 via the respective base stations and provides functions such as authentication, mobility management, charging and so on. Communications devices may also be referred to as mobile stations, user equipment (UE), user device, mobile radio, and so forth. Base stations may also be referred to as transceiver stations/NodeBs/eNodeBs (eNB for short), and so forth.

The base stations or eNodeBs and UE described herein may comprise a transmitter (or transmitter circuitry), a receiver (or receiver circuitry), and a controller (or controller circuitry). A controller may be, for example, a microprocessor, a CPU, or a dedicated chipset, etc., configured to carry out instructions which are stored on a computer readable medium, such as a non-volatile memory. The processing steps described herein may be carried out by, for example, a microprocessor in conjunction with a random access memory, operating according to instructions stored on a computer readable medium. The base stations or eNodeBs may comprise more than one communications interface (and associated transmitter and receiver circuitry), such as a wireless communications interface for communication with one or more UEs and a communications interface (which may be wired or wireless) for communication with one or more core network equipment.

Wireless communications systems such as those arranged in accordance with the 3GPP defined Long Term Evolution (LTE) architecture use an orthogonal frequency division modulation (OFDM) based interface for the radio downlink (so-called OFDMA) and a single carrier frequency division multiple access scheme (SC-FDMA) on the radio uplink Other examples of wireless communications systems include those operating in accordance with 5G in which a radio network is formed by infrastructure equipment referred to as wireless transceiver units.

In a conventional fourth generation mobile network, service to user equipment such as the user equipment 104 is provided by a combination of a radio access network comprising one or more eNodeBs, such as the eNodeB 102, connected to an enhanced packet core (EPC) network such as EPC network 106 which may comprise core network equipment (not shown in detail).

The eNodeBs 101 and 103 are examples of base stations according to a possible future network architecture (which may be referred to as '5G') in which the radio access network is connected to a new core network such as 5G core network 105 which may comprise core network equipment (not shown in detail). It may be that an eNodeB such as the eNodeB 103 is simultaneously connected to two core networks such as the core network 106 and the core network 105.

The 5G core network 105 may comprise one or more Access and Mobility Management Functions (AMF) (not shown in FIG. 1). The eNodeBs 101 and 103 may be connected to an AMF within the 5G core network 105.

The eNodeBs 101, 102 and 103 may operate substantially in accordance with an LTE specification (or variants and updates thereof) at least in respect of the radio interface between the eNodeB and the UE 104.

However in light of the use of different core networks there can be expected to be differences between the operation of interfaces between the core network and the eNodeBs i.e. between the eNodeBs 102 and 103 and the EPC core network 106 and between the eNodeB's 103 and 101 and the 5G core network 105. These differences may support, for example, different types of end to end flows.

Figure 2A:
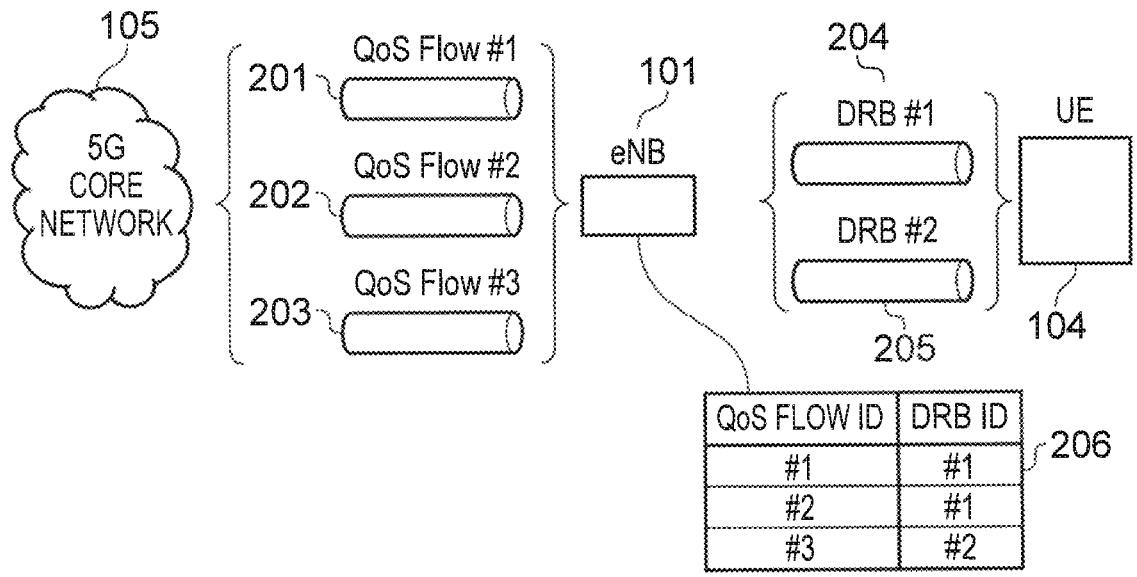
FIGS. 2A and 2B illustrate an example of logical channels which are used for transmissions between a core networks, eNBs and UE of FIG. 1.
Figure 2B:
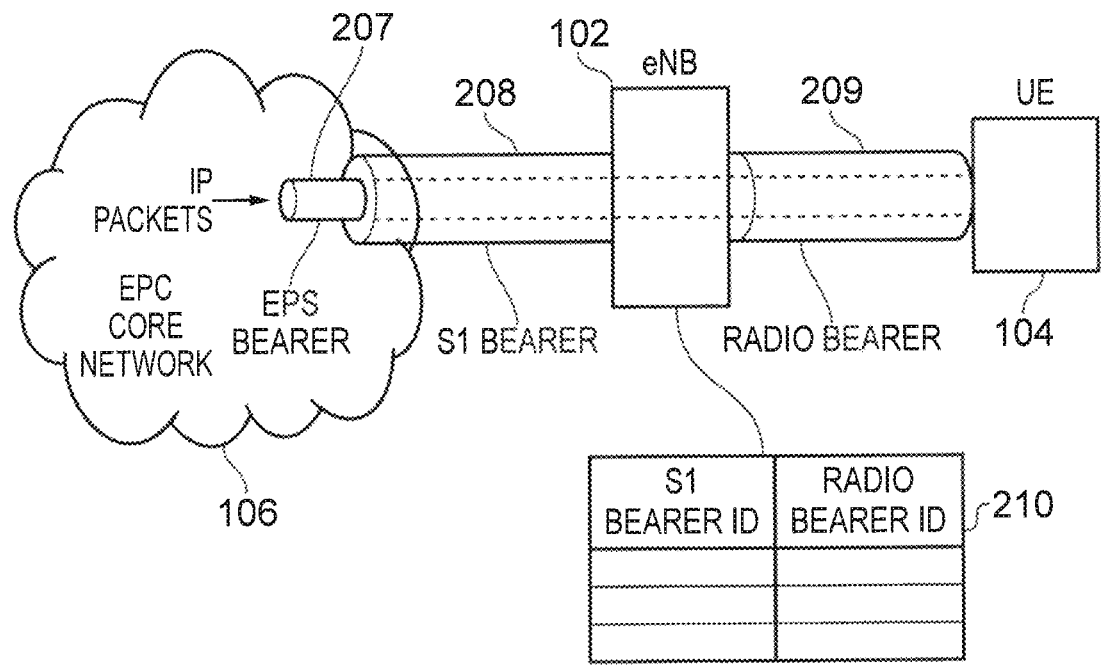

An example of these differences is shown in FIGS. 2A and 2B which illustrate possible logical connections between the respective core networks and UE 104. Data received by the core networks 105, 106 for transmission to the UE 104 is typically formed of packets which are formatted according to a specified protocol. In the following description, it is assumed that these packets are formed in accordance with an internet protocol (IP). However, it will be appreciated that any other appropriate packet format may be used instead.

FIG. 2A shows the logical connections between the 5G core network 105, the eNodeB 101 and the UE 104. An IP packet received in the 5G core network 105 is assigned to a particular quality of service (QoS) flow such as QoS flows 201, 202 and 203. Each of the QoS flows may be characterised by a QoS flow ID and may be associated with a quality of service requirement (such as one or more of a guaranteed bit rate, a maximum bit rate, a maximum latency, a permitted packet loss ratio and the like). Although not shown in FIG. 2A, the QoS flows 201, 202 and 203 are end to end between the 5G core network 105 and the UE 104. That is to say the UE knows the parameters associated with each of the QoS flows 201, 202, 203.

An eNodeB connected to the 5G core network such as the eNodeB 101 is also aware of the QoS flows. The eNodeB 101 establishes logical connections with the UE which may be data radio bearers (DRB) 204 and 205. These may operate substantially in accordance with the specifications for LTE radio bearers. Each of the DRBs 204 and 205 may be associated with a pair of corresponding packet data convergence protocol (PDCP) entities described below.

In accordance with a 5G system architecture as shown in FIG. 2A, one DRB (such as the DRB 204) may be used to transport packet data associated with two QoS flows (such as the QoS flows 201 and 202). In order to accommodate this flexibility, the eNodeB 101 may maintain a mapping table such as table 206 or equivalent in order to store a mapping between each of the QoS flows and the respective DRB. Using the table, the eNodeB 101 is able to assign packets received from the 5G core network 105 over the QoS flows 201, 202, 203 to the appropriate data radio bearers 204 and 205 for transmission to the UE 104.

The architecture according to conventional LTE and EPC specifications is shown in FIG. 2B. An IP packet received in the enhanced packet core network 106 is associated with an evolved packet system (EPS) bearer such as an EPS bearer 207. The EPS bearers are transported by means of an S1 bearer (such as S1 bearer 208) between the EPC and the eNodeB and by means of a radio bearer (such as radio bearer 209) to the UE 104.

Unlike the architecture of FIG. 2A, the EPC architecture as illustrated in FIG. 2B is based on a one-to-one mapping between EPS bearers and radio bearers. The eNodeB (such as the eNodeB 102 of FIG. 2B) maintains a table (such as table 210) which maps one S1 bearer to one radio bearer and thus provides end-to-end EPS bearer connectivity between the EPC core network and the UE.

FIGS. 3A and 3B show protocols and corresponding PDU formats used in the architectures shown in FIGS. 2A and 2B respectively. It will be appreciated that the embodiments described herein may apply in scenarios where additional protocols, which are not shown in FIGS. 3A and 3B, are used; for example, radio interface protocols such as a radio link control (RLC) protocol, a medium access control (MAC) protocol and physical layer protocols may be used to provide the radio interface between the eNodeB and the UE. Protocols that operate above the IP protocol layer, such as a user datagram protocol (UDP), a transmission control protocol (TCP) and a hypertext transfer protocol (HTTP), may also be used. Transport protocols such as those that operate between the core network and the eNodeB may also be used.

FIG. 3A shows an IP packet 301 which is received from the 5G core network 105 by the eNodeB 101. The IP packet 301 is associated with a protocol data unit (PDU) session (not shown), and a QoS flow, such as one of the QoS flows 201, 202, 203 of FIG. 2A. The PDU session may comprise multiple QoS flows and, in the example of FIG. 3A, the QoS flows 201, 202, 203 may all be associated with (that is, form a part of) the same PDU session. In order to provide the mapping between multiple QoS flows and a single radio bearer as described above, a service data adaptation protocol (SDAP) protocol is used by the eNodeB 101 and UE 104. Packets, such as packet 302, transmitted by the eNodeB to the UE include a corresponding header generated according to the SDAP protocol. In addition, the packet 302 is generated in accordance with the PDCP protocol, and includes a header generated by the PDCP protocol. Although FIG. 3A shows only a single SDAP entity and a single PDCP entity at each of the UE and the eNodeB, there may be multiple SDAP entities and/or multiple PDCP entities. In particular, there may be one pair of SDAP entities (a pair comprising an entity at the UE and a peer entity at the eNodeB) associated with a PDU session and one pair of PDCP entities for each radio bearer. For example, referring to FIG. 2A, DRB 204 may have an associated PDCP entity and an associated SDAP entity at the eNodeB and an associated PDCP entity and an associated SDAP entity at the UE. In some instances, SDAP is used only where multiple QoS flows are mapped to a single radio bearer.

In contrast, as shown in FIG. 3B, an IP packet 303 received by the eNodeB from the EPC core network 106 is processed according to a PDCP protocol and accordingly, a packet 304 transmitted by the eNodeB to the UE includes a PDCP header. Since SDAP is not used for IP packets received from the EPC core network, there is no SDAP header included in the packet 304. Although FIG. 3B shows only a single PDCP entity at each of the UE and the eNodeB, there may be multiple PDCP entities—in particular, there may be one pair of PDCP entities for each radio bearer.

The term 'protocol entity' as used herein is used to illustrate the various processing steps carried out by an eNodeB or a UE. That is, the existence of an entity of a protocol implies that processing is carried out on certain data either to be transmitted or received, in accordance with the specifications of that protocol. The protocol may, for example, specify the addition or removal of header information, data compression or decompression, the maintenance of state information based on the transmission or reception of data or other functions as will be known to the skilled person. Protocol entities may be logically arranged within an entity such as the UE 104 or the eNodeBs 101,102 to process the data sequentially according to a defined sequence, for example in accordance with a layered protocol model such as the well-known OSI protocol model.

EXAMPLE EMBODIMENTS

The problems that are addressed by the embodiments of the present technique relate to the different architectures used and different set of protocols used by the eNodeB's 101, 102 and their respective core networks 105, 106. Embodiments of the present technique address technical problems in the handover preparation phase which arise as a result of the possibility of mapping multiple QoS flows to a single data radio bearer according to a 5G network architecture, while no corresponding mapping is possible in the EPC architecture. As shown in FIGS. 3B and FIG. 2B, the mapping between EPS bearer and radio bearer is on a one-to-one basis. Further embodiments of the present technique address the data forwarding step shown in 403 and 404 of FIG. 4 (described below) in light of the architectural differences described above.

Figure 4:
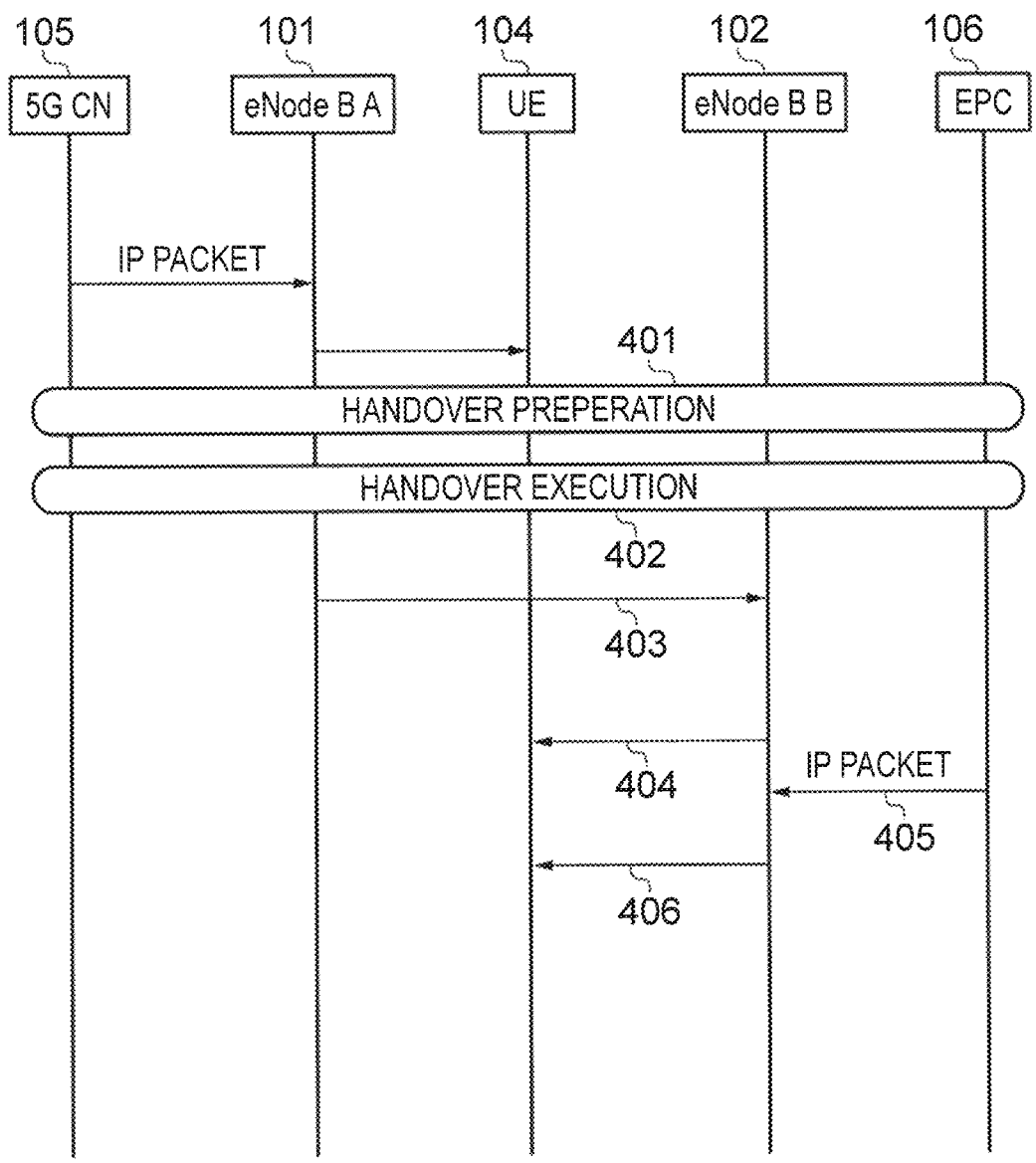
FIG. 4 is an example message sequence diagram corresponding to an inter-system handover for a UE between an eNB connected to a 5G core network and an eNB connected to a EPC core network.

FIG. 4 illustrates a handover procedure in which embodiments of the present technique may be applicable. The UE 104 is initially served by a cell controlled by the eNodeB 101 which is connected to the 5G core network 105. As such, the UE 104 has established one or more QoS flows, which it receives over one or more radio bearers from the eNodeB 101. After the handover, the UE 104 is served by a cell controlled by the eNodeB 102 which is connected to the EPC core network 106.

At some point (not shown in FIG. 4), the eNodeB 101 determines that it is appropriate for the UE to be transferred to the control of the eNodeB 102. This may be based on handover criteria being met. This determination may be based on measurement reports received from the UE or on signal strength measurements or signal quality measurements made by the eNodeB in respect of signals received from the UE or based on a current load of the eNodeB 101 or on any other appropriate factors.

In some embodiments, the source eNodeB 101 and the target eNodeB 102 may be the same eNodeB (e.g. they may be eNodeB 103), having connections to both the 5G core network 105 and the EPC network 106. In some such embodiments, the eNodeB may control multiple cells, and the handover may be between different cells which are controlled by the same eNodeB; in other such embodiments, the handover may be an intra-cell handover; that is, the source and target cells may be the same.

In response to the determining that the handover criteria are met, a handover preparation phase 401 is initiated by the eNodeB 101. As part of the handover preparation phase, the eNodeB 101 may determine capabilities of the target eNodeB 102, such as whether it is connected to an EPC network or a 5G core network (or both). The eNodeB 101 may also determine (for example, based on the determined connectivity of eNodeB 102) whether the handover must be initiated via the 5G core network, by means of signalling between the eNodeB 101 and the 5G core network 105, or whether the handover may be initiated directly with the eNodeB 102, such as by means of an interface connecting the two eNodeBs directly.

The eNodeB 101 transmits a request (either directly, or via the 5G core network 105) to the eNodeB 102 informing the eNodeB 102 that it considers handover criteria to have been met in respect of the UE 104, and in respect of a target cell which is under the control of the eNodeB 102.

In some embodiments, the source eNodeB does not determine an identity of the target eNodeB, but may rely on a routing functionality within the 5G core network and/or the EPC network to route messages appropriately based on, for example, a globally unique cell identifier associated with the target cell.

The eNodeB 102 reserves radio resources for the use of the UE 104 in the target cell and confirms to the eNodeB 101 that it is able to accept the handover of UE 104. A description of the reserved radio resources may be included in a signalling message sent from the eNodeB 102 to the eNodeB 101, for onward transmission to the UE 104. In some embodiments of the present technique, the description of the reserved radio resources includes a mapping of radio bearers to EPS bearers. In some embodiments it may indicate (explicitly or implicitly) that packets that would have been associated with the QoS flows that are active in the source cell (such as the flows 201, 202 and 203 of FIG. 2A) will all be carried over a single EPS bearer, such as the EPS bearer 207 in FIG. 2B. Alternatively, a different mapping may be indicated explicitly.

As will be appreciated, the handover preparation phase 401 may include other steps and other signalling.

Subsequent to the handover preparation phase, handover execution then occurs at step 402. In this step the UE 104 is commanded to change its serving cell and to connect to the target eNodeB 102. As a result, it obtains service (i.e. data connectivity) via the EPC 106 and eNodeB 102 in the target cell. At this point in some embodiments, the UE 104 uses one or more of the EPS bearers configured for the use of the UE 104 in the target cell, and uses an EPS bearer to DRB (one-to-one) mapping, in place of the QoS flow to DRB mapping that was in use in the source cell.

It is desirable that no packets are lost as a result of this handover procedure; that is, that all IP packets destined for the UE, whether received at the 5G core network 105 or at the EPC network 106, are ultimately delivered to the UE. It may be the case that IP packets are received by the eNodeB 101 from the 5G core network 105 but are never transmitted to the UE 104 by eNodeB 101 because, for example, the eNodeB 101 does not have an opportunity to transmit these IP packets before the UE changes its serving cell as part of the handover execution phase 402. Alternatively it may be that an IP packet received from the 5G core network by eNodeB 101 was transmitted to the UE 104 but was not successfully received by the UE. The eNodeB 101 may identify this situation by the lack of receipt of a positive acknowledgement of the IP packet from the UE 104.

To mitigate these scenarios, packets may be transmitted by the source eNodeB 101 to the target eNodeB 102 as shown in step 403 for onward transmission in step 404 to the UE 104. In some embodiments, the data forwarding steps 403 and 404 form a part of the handover execution phase 402. For clarity in the following descriptions, they are described as being separate from the handover execution phase 402; however, this is not intended to limit the scope of the techniques described herein to exclude embodiments in which data forwarding (such as data forwarding steps 403 and 404) is considered part of the handover execution phase (such as the execution phase 402).

Preparation Phase

Figure 5:
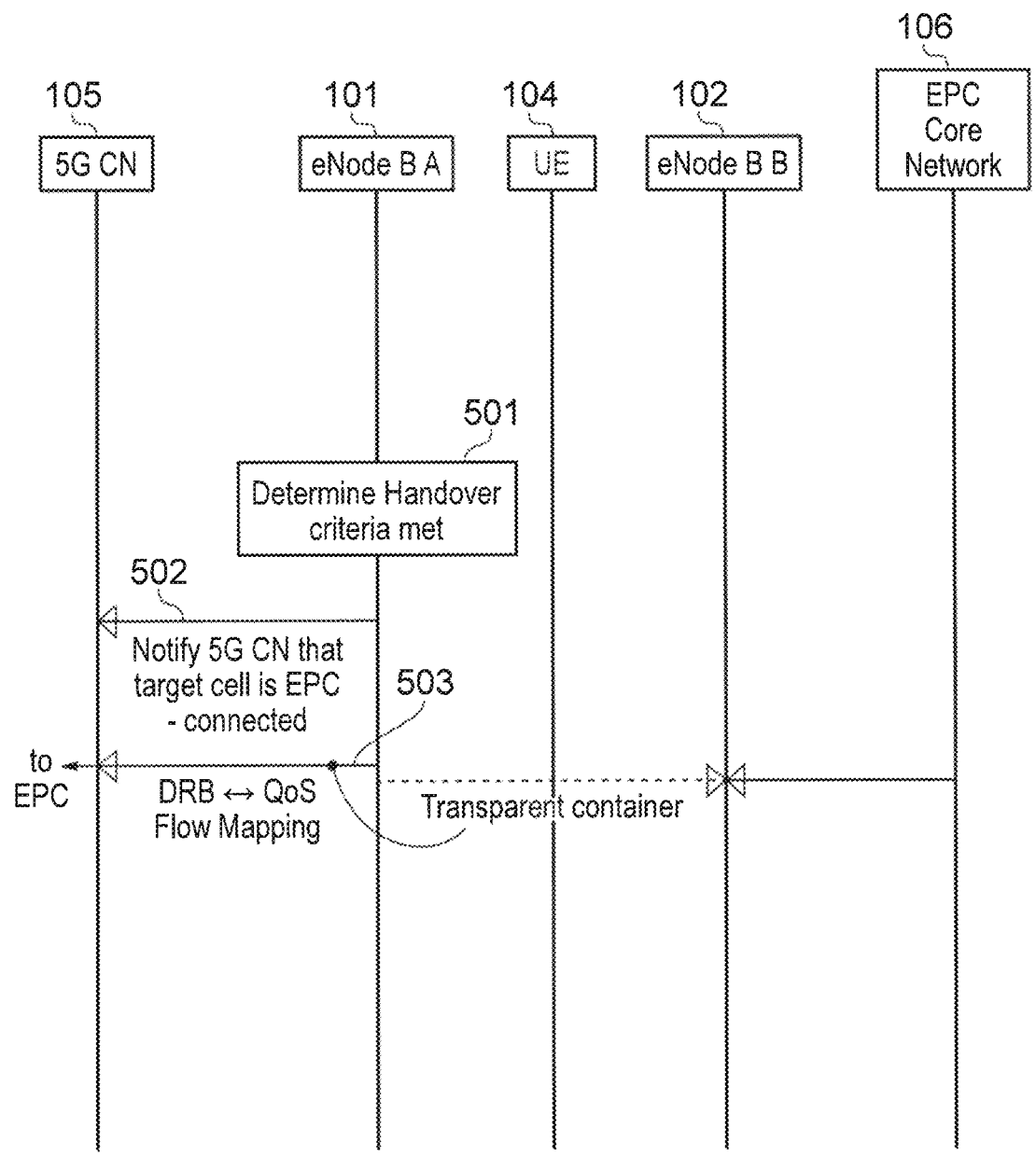
FIG. 5 is an example message sequence diagram illustrating a technique for a handover preparation phase in accordance with an embodiment of the present technique.

FIG. 5 illustrates an example embodiment of the present technique, in which the UE 104 is connected to the source eNodeB 101 which is an eNodeB controlling an LTE cell and which is connected to the 5G core network 105.

In step 501 the eNodeB which is controlling the UE determines that handover criteria are met in respect of a target cell controlled by eNodeB 102.

In response to determining that the handover criteria are met, the eNodeB 101 determines that it is appropriate to notify the 5G core network that the handover has been triggered by means of a signalling message such as message 502. According to embodiments of the present technique, the eNodeB 101 determines that the target cell is controlled by an eNodeB (such as the eNodeB 104) which is connected to an EPC network such as EPC network 106. Responsive to this determination, the notification 502 to the 5G core network 105 may include a handover type indication of "5GC to EPC". More generally, the notification 502 may include a handover type information element indicative that, although the source and target radio technologies may be both the same (e.g. both based on LTE), the core networks by which the connectivity for the UE 104 is to be achieved after handover is different from the core network by which connectivity is to be achieved prior to the handover. For example, the notification 502 may indicate that the current core network is the 5G core network 105, and that the second core network will be the EPC network 106.

In other embodiments not shown in the figures, a notification from an eNodeB which is connected to an EPC network may indicate to the EPC network that the handover corresponds to a type whereby the first (current) core network is an EPC core network, and the second (target) will be an 5G core network.

Notifying the 5G core network that the target cell is EPC connected may ensure that the 5G core network is able to direct further signaling in respect of the handover preparation phase towards the appropriate EPC core network and may be used by the 5G core network to perform any necessary mapping between QoS flows in the 5G core network and EPS bearers in the EPC core network.

According to other example embodiments, the eNodeB 101 also transmits to the 5G core network equipment a representation of its mapping table 206 which indicates the correspondence between data radio bearers, such as DRBs 204 and 205, by which the source eNodeB 101 communicates with the UE 104, and end-to-end QoS flows, such as QoS flows 201, 202, 203, by which IP packets are transferred from the 5G core network 105 to the UE 104. This is indicated in step 503. Steps 503 and 502 may comprise the transmission of two separate messages or may be combined in a single message.

In addition, the source eNodeB 101 may include in a message containing indications 502 and/or 503 a transparent container which is an information element constructed by the eNodeB 101 to be passed to the target eNodeB 102 having been transmitted transparently via the core networks 105, 106.

A benefit of this example embodiment is that a source eNodeB (such as eNodeB 101) does not need to be aware of a QoS flow to EPS bearer mapping that will be used when the handover is carried out. In such an embodiment the necessary mapping between the QoS flows and EPS bearer is performed after the handover by the 5G core network.

Figure 6:
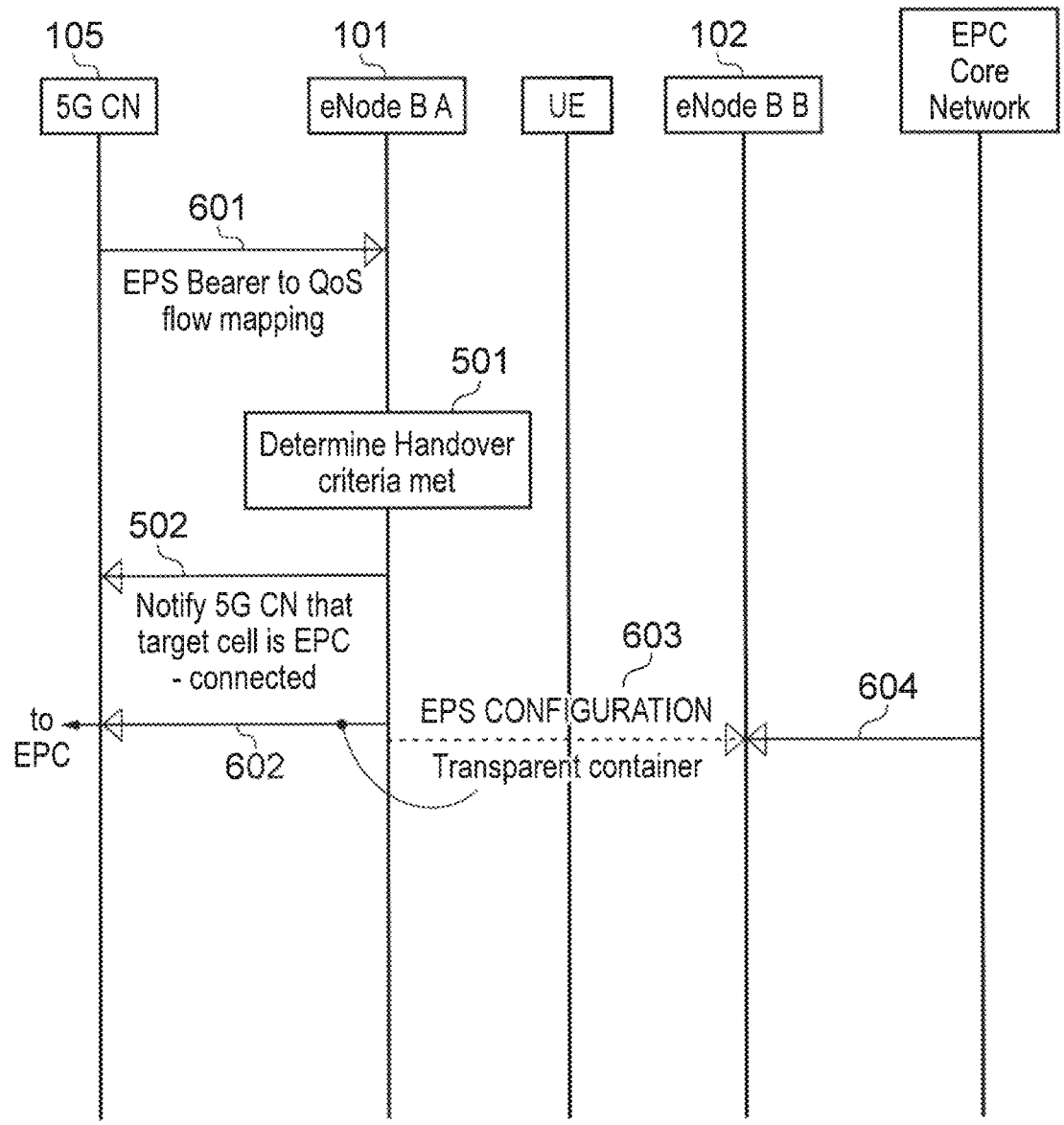
FIG. 6 is an example message sequence diagram illustrating a further technique for a handover preparation phase in accordance with an embodiment of the present technique.

FIG. 6 shows an alternative embodiment of the present technique. In step 601, the eNodeB 101 receives from the 5G core network 105 an indication of a mapping that will be used between EPS bearers and QoS flows should a handover occur. This may occur as part of an establishment procedure for the QoS flows. The process then proceeds with step 501 and step 502 as already described above.

The eNodeB 101 constructs an EPS configuration indication 603 by combining the EPS bearer to QoS flow mapping received in step 601 with the QoS flow to DRB mapping table 206. In some embodiments, the resulting indication comprises an EPS bearer to DRB mapping. In some embodiments this may result in an EPS configuration indication 603 which can be understood by the target eNodeB 102 even if the eNodeB 102 is not a 5G-aware eNodeB—that is to say, has not been upgraded to support functionality associated with interworking with 5G core networks. In some embodiments, the EPS configuration indication 603 comprises a QoS flow to EPS bearer mapping associated with a DRB configuration that is in use by the source eNodeB 101

In step 602, the eNodeB 101 transmits to the 5G core network 105 a transparent container for onward transmission to the target eNodeB 102 containing the EPS configuration indication 603.

eNodeB 102 may receive the transparent container in message 604, which may be a Handover Request message.

A benefit of this embodiment is that it may be used in the case of an X2 based handover in which the transparent container containing the EPS configuration indication 603 may be sent directly from source eNodeB 101 to target eNodeB 102 without passing through the core networks 105, 106.

Figure 7:
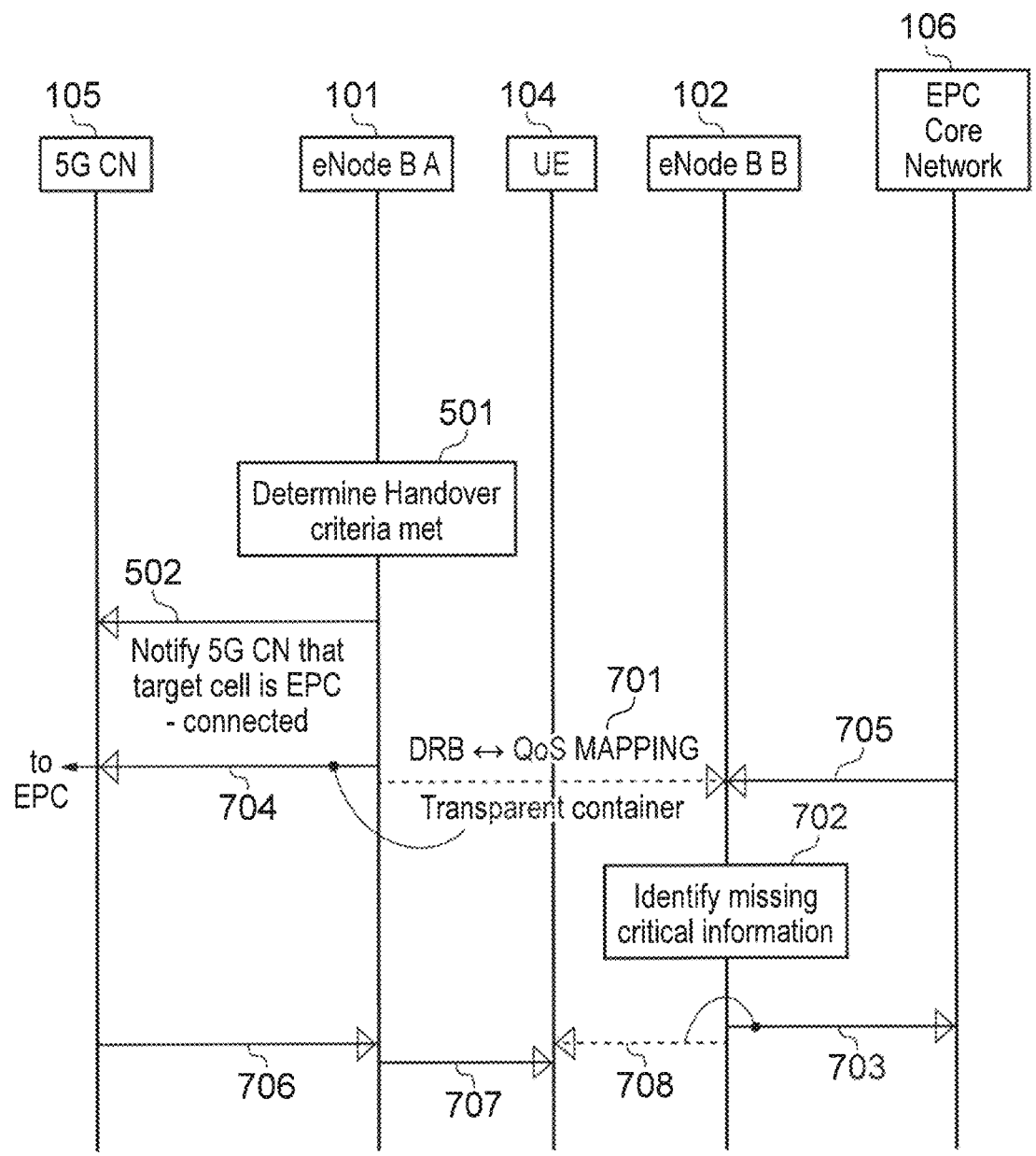
FIG. 7 is an example message sequence diagram illustrating yet a further technique for a handover preparation phase in accordance with an embodiment of the present technique.

FIG. 7 shows an alternative embodiment of the present technique. In the embodiment of FIG. 7, the process starts as in FIG. 5 with steps 501 and 502. In step 704, the eNodeB 101 sends a message to the 5G core network including a transparent container which includes a data radio bearer (DRB) to QoS mapping indication 701. This may be a representation of table 206. The target eNodeB 102 may receive the transparent container in a message 705, which may be a Handover Request message. Based on the indication 701, eNodeB 102 maps QoS flows used in the 5G core network 105 (such as the QoS flows 201, 202, 203) to EPS bearers (such as the EPS bearer 207) used in the EPC network 106, and hence determines an appropriate data radio bearers for each of the IP packets which are associated with the respective QoS flows.

In some embodiments, 5G core network 105 provides a QoS flow to EPS bearer mapping (which may be substantially the same as the information described above in step 601 of FIG. 6) to the EPC network 106. In some embodiments, the EPC network 106 provides the QoS flow to EPS bearer mapping to the target eNodeB 102, and the target eNodeB 102 performs the mapping of the QoS flows and radio bearers indicated in indication 701 to the corresponding EPS bearers based on the QoS flow to EPS bearer mapping received from EPC core network 106.

In some embodiments, the target eNodeB 102 determines that a full configuration handover is required. This determination may be based on the determination that the target eNodeB 102 is unable to parse the transparent container received from the eNodeB 101. For example (as shown in step 702) it may determine that that critical information which it expects to receive in a transparent container (e.g. in accordance with a specification) is missing. In one example, it may determine a full configuration handover is to be performed based on an absence of an identifier of an EPS bearer in a transparent container (such as the transparent container containing indication 701) received from the source eNodeB 101. In a further example, the target eNodeB 102 determines that a full configuration is required if a security algorithm in use in the source cell is not supported in the target cell (e.g. because it is not supported by the EPC core network 106).

The determination to perform a full configuration handover may be based on predetermined conditions comprising one or more of the above.

In some embodiments a determination to perform a full configuration handover by the eNodeB 102 precludes a determination that the handover is considered to have failed, as may be done in a conventional approach.

Responsive to this determination, initiates a full configuration handover in which resources in a target cell are reserved and associated with an EPS bearer, without reference to, for example, data radio bearers used for corresponding EPS bearers or QoS flows in a previous cell. According to some embodiments in which a full configuration handover is performed, after the handover execution phase the UE 104 discards, or operates without reference to, any PDCP protocol state information stored while operating in the source cell, regardless of whether a radio bearer corresponding to the respective PDCP protocol entity is operating in an acknowledged mode or in an unacknowledged mode.

According to some embodiments in which a full configuration handover is performed, the target eNodeB 102 constructs a handover command message which is transmitted in a transparent container, such as the transparent container 708 indicated by a dashed line in FIG. 7, to the UE 104 which includes a description of the radio resources reserved in the target cell without reference to the configuration of the radio resources which are assigned to the UE 104 by the source eNodeB 101 for use by the UE 104 in the source cell. In some embodiments in which a full configuration handover is performed, the description of the radio resources includes an indication of the correspondence between reserved radio resources and one or more EPS bearers.

The transparent container 708 containing the handover command is transported from the target eNodeB 102 to the UE 104 by means of messages 703, 706, 707 sent via the core networks 105, 106 and the source eNodeB 101. (Messages carrying the transparent container within or between the core networks 105, 106 are not shown).

After receiving the transparent container 708, in some embodiments the UE 104 may determine that an identity of a core network bearer (such as an identity of the QoS flows 201, 202, 203) which is active in the source cell is not present in the handover command Responsive to this determination, the UE 104 nevertheless proceeds with the handover. In particular, the UE 104 does not determine that the handover message is erroneous. In some embodiments, the UE 104 further determines that the handover message is not erroneous, based on a presence of the identity of a bearer (such as the identity of the EPS bearer 207) of the type corresponding to the core network technology (e.g. 5G, EPC) associated with the target cell.

According to some embodiments in which a full configuration handover is performed, the handover command message describes radio resources which are associated with one or more EPS bearers for use in the target cell. However, the UE 104, when operating in the source cell and connected to the source eNodeB 101, associated IP packets with one or more QoS flows. Therefore, in some embodiments, the UE 104, based on a combination of a QoS flow to EPS bearer mapping and the previous QoS flow description, determines which EPS bearer (and therefore which radio bearer and corresponding radio resources) in the target cell to associate with an IP packet which is to be transmitted in the target cell to the target eNodeB 102. The UE 104 transmits the IP packet to the target eNodeB 102 in accordance with this determination. In some embodiments, the UE receives a representation of the QoS flow to EPS bearer mapping either prior to or during a handover preparation phase (such as the handover preparation phase 401).

The embodiment shown in FIG. 7 has the benefit that it does not require the eNodeB 101 to have received the EPS bearer to QoS flow mapping and it further simplifies the operation of the eNodeB 101 because the indication 701 sent in the transparent container is information that it has readily available without requiring any further mapping.

In the embodiments described above, one or more of the indications transmitted from the source eNodeB to the 5G core network (such as messages 502, 503, 602, 704) may be transmitted in a Handover Required message.

The transparent containers 603, 701 may be forwarded from the source eNodeB 101 to the target eNodeB 104 via the 5G core network 105 and the EPC network 106. The transparent container may contain an RRC Handover preparation information element, which may be in conformance with an RRC HandoverPreparationInformation information element defined in 3GPP TS 36.331.

The transparent containers 603, 701 may be transmitted directly from the source eNodeB 101 to the target eNodeB 104 via an interface (such as an X2 interface) between the eNodeBs which does not require the transparent container to traverse a core network. The transparent container in this case may be sent in a Handover Request message.

Data Forwarding

Figure 8:
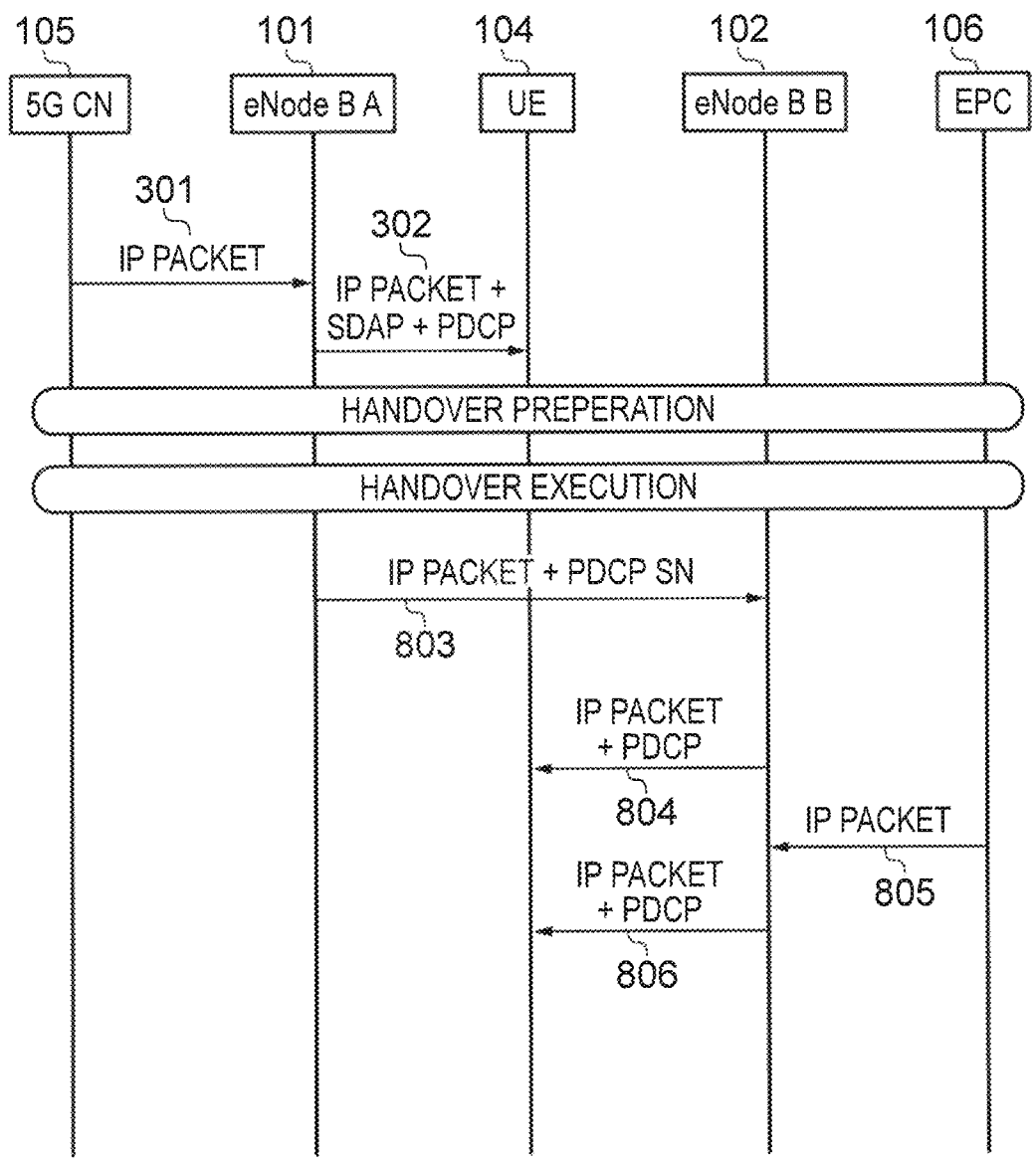
FIG. 8 is an example message sequence diagram illustrating a technique for the forwarding of data as part of a handover procedure between eNBs connected to different core networks.

FIG. 8 is a message flow diagram illustrating aspects of an embodiment of the technique which addresses the problem of forwarding data from the source eNodeB 101 to the target eNodeB 102 to ensure reliable delivery of all IP data packets.

The process starts with IP packets such as IP packet 301 being transmitted from the 5G core network to the eNodeB 101, where they are associated—as illustrated in FIG. 2A—with a QoS flow such as QoS flow 201. These messages are then processed according to the SDAP protocol and PDCP protocol in the eNodeB 101 as illustrated in FIG. 3A and are transmitted to UE 104 as data packets such as the data packet 302 which includes the IP packet together with an SDAP header and a PDCP header.

The details of the handover preparation phase and the handover execution phase have broadly been described above and are omitted here for conciseness.

Figure 9:
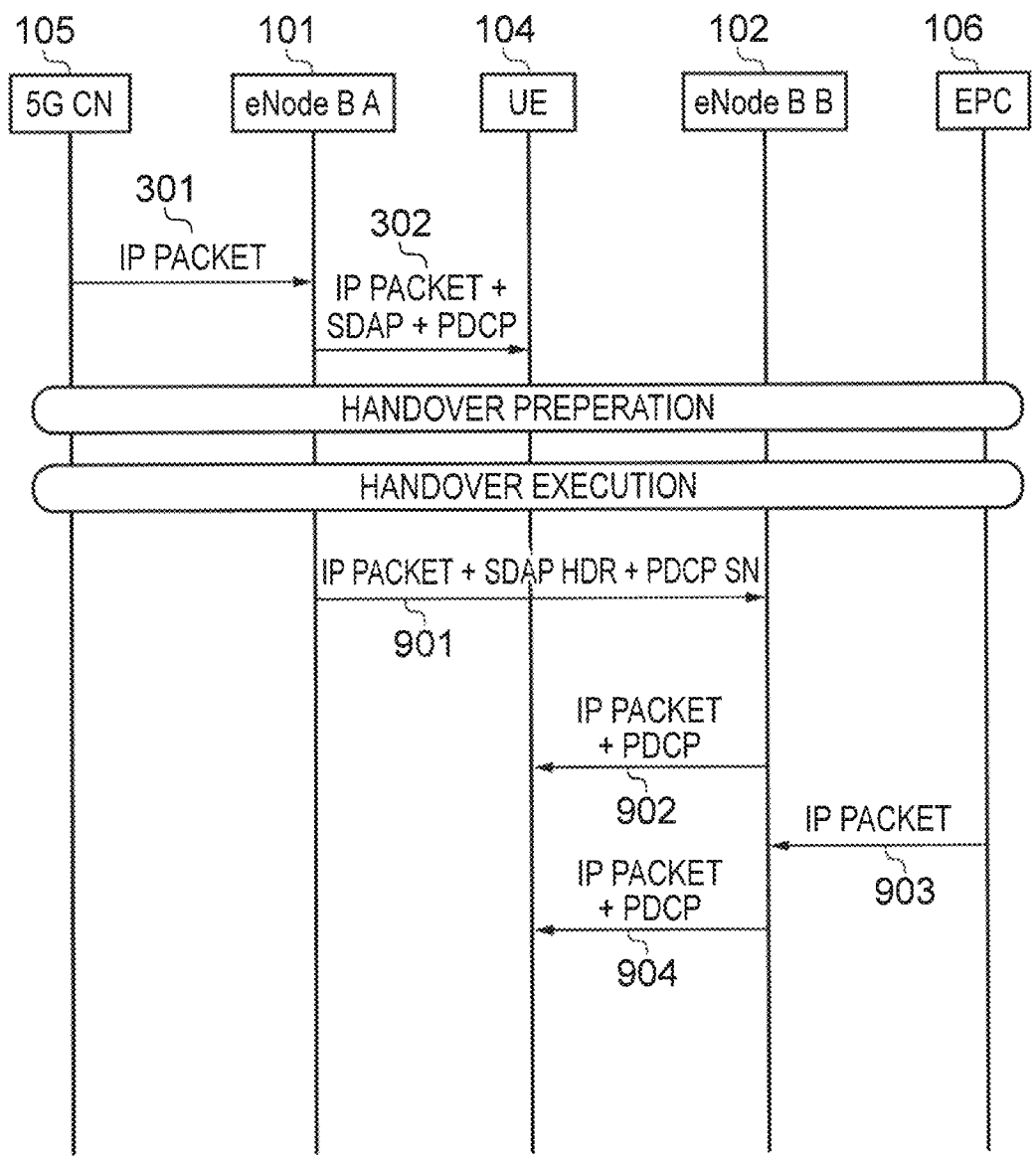
FIG. 9 is an example message sequence diagram illustrating a further technique for the forwarding of data as part of a handover procedure between eNBs connected to different core networks.
Figure 10:
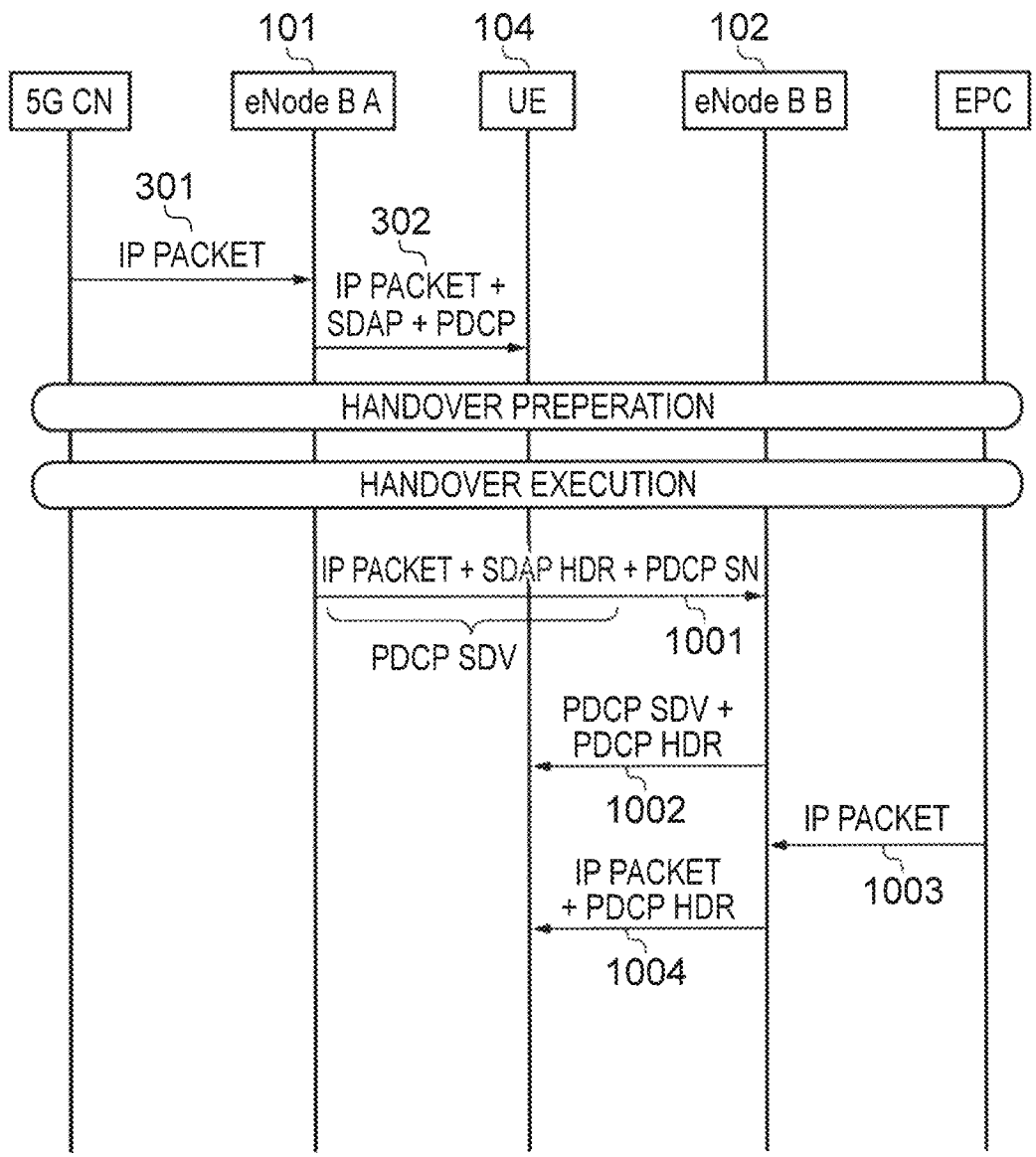
FIG. 10 is an example message sequence diagram illustrating yet a further technique for the forwarding of data as part of a handover procedure between eNBs connected to different core networks.

Once the handover execution phase is complete, the UE 104 is no longer served by the source eNodeB 101 and any IP packets which remain stored at the eNodeB 101, which have not been positively acknowledged as having been received by UE 104, must be forwarded to eNodeB 102. As described above, in accordance with embodiments described herein, the forwarding of IP packets may be carried out after the handover execution phase (as illustrated in FIGS. 8, 9, and 10) or as part of the handover execution phase.

In the embodiment illustrated in FIG. 8, the eNodeB 101 may have already associated a PDCP sequence number with an IP packet received from the 5G core network 105. The eNodeB 101 may, in addition, have already constructed a data packet for transmission to the UE 104 which includes both an SDAP header and a PDCP header. In the embodiment of FIG. 8, the PDCP header and the SDAP header are removed, if they have been already constructed, and the IP packet is forwarded together with the PDCP sequence number in message 803 from the source eNodeB 101 to the target eNodeB 102.

The message 803 may be transmitted directly from the eNodeB 101 to the eNodeB 102, for example, by means of an X2 interface, or it may be transmitted indirectly via the respective core networks 105, 106. The eNodeB 102 processes the forwarded IP packet according to the PDCP protocol, based on the PDCP sequence number received from the source eNodeB 101. It then forwards the IP packet complete with a PDCP header to the UE in message 804.

As will be appreciated, this corresponds to the format used for transmission of IP packet 304 in FIG. 3B; that is to say, the format of the data transmitted from eNodeB 102 to the UE complies with the format that would be expected for packets received directly from the EPC network, such as IP packet 805 which is transmitted to the UE in transmission 806.

The embodiment shown in FIG. 8 therefore has the advantage that no additional functionality is required in target eNodeB 102 above and beyond that which is already required in respect of handovers from other EPC-connected eNodeBs.

In some embodiments, the UE 104 releases its SDAP entity at the point at which handover execution occurs; in other words, at the point at which it expects to no longer receive packets which have been processed by the SDAP entity of the source eNodeB 101. In some further embodiments, the inclusion of the PDCP sequence number in message 803 is optional. In further embodiments the PDCP sequence number is omitted for all transmissions 803.

In some embodiments, the source eNodeB 101 determines whether a full configuration handover has been performed. In some embodiments the source eNodeB 101 may determine whether the number of PDCP entities associated with the UE 104 will be the same in the target eNodeB 102 after the handover execution as it is in the source eNodeB 101.

If the source eNodeB 101 determines that full configuration handover has been performed, or if the source eNodeB 101 determines that the number of PDCP entities associated with the UE 104 will not be the same in the target eNodeB 102 as it is in the source eNodeB 101, the source eNodeB forwards IP packets to the target eNodeB, with no associated PDCP sequence number and without any SDAP or PDCP headers.

In some embodiments, the source eNodeB 101 determines on a packet-by-packet basis whether or not a PDCP sequence number has been assigned to a particular packet such as the packet 301. If no sequence number has been assigned, the source eNodeB forwards the IP packet to the target eNodeB 102, with no associated PDCP sequence number or SDAP or PDCP headers.

In some embodiments, if the source eNodeB determines that a full configuration handover has not been performed, and that the number of PDCP entities associated with the UE 104 will be the same in the target eNodeB 102 as it is in the source eNodeB 101, and that a PDCP sequence number has been assigned to a particular packet, then the packet is forwarded, together with the PDCP sequence number and, in some embodiments, together with an SDAP header.

FIG. 9 illustrates a further embodiment of the present technique. In FIG. 9, the messages 301 and 302 are as already described above. In the embodiment shown in FIG. 9, once the eNodeB 101 identifies that it has a packet to be forwarded to the target eNodeB 102 the packet is forwarded as shown at step 901, formatted to include the IP packet and an SDAP header and sent together with a PDCP sequence number. No PDCP header is included in the transmission 901. In this embodiment, a representation of the mapping between the QoS flows and the EPS bearers is received by the target eNodeB 102 (not shown in FIG. 9), and this information is used to map each packet received from source eNodeB 101 to an appropriate radio bearer (such as the radio bearer 209) that has been established between the target eNodeB 102 and the UE 104. Based on the mapping, and taking into account the SDAP header associated with the transmission 901, the target eNodeB 102 associates the IP packet and the PDCP sequence number with an appropriate PDCP entity which is currently in operation and which has a peer corresponding entity at the UE 104.

The eNodeB 102 removes the SDAP header from the packet received in transmission 901 and attaches an appropriate PDCP header in a transmission 902 to the UE 104.

In the example shown in FIG. 9 the processing, whereby the QoS flow to EPS bearer mapping is made use of to process forwarded packets (such as the packet in 901), is shown as being co-located with the target eNodeB 102. However, this functionality may exist elsewhere in the network as a separate entity.

As with the embodiment illustrated in FIG. 8, this approach has the benefit that a packet received by the UE 104 once it is in the target cell conforms to the protocols used in an EPC-connected cell as illustrated in FIG. 3B. This approach also has the advantage that packets which are created in eNodeB 101 for transmission to the UE can be forwarded with minimal further processing to eNodeB 102 thereby simplifying the implementation of eNodeB 101.

FIG. 10 illustrates yet a further embodiment of the present technique. In FIG. 10, an IP packet such as IP packet 301 is forwarded to UE in a message 302 which includes an SDAP header and a PDCP header. After handover execution, the eNodeB 101, determining that it has a packet which may not have been correctly received by the UE either because it was never transmitted to the UE or because it was transmitted to the UE but not acknowledged, forwards the packet to eNodeB 102.

In the embodiment illustrated in FIG. 10, the packet is formatted so as to be understood by the target eNodeB 102 as comprising a PDCP service data unit (SDU) together with a PDCP sequence number. As such, the message 1001 as received by the eNodeB 102 appears to the eNodeB 102 as a message compliant with conventional data forwarding messages used between LTE eNodeBs.

However, in this case the PDCP SDU portion includes, as well an IP packet, an SDAP header which has been added by an SDAP protocol entity of the source eNodeB 101. The forwarded packet does not include a PDCP header.

The eNodeB 102 processes the received message 1001 as if it were a forwarded LTE message comprising a PDCP SDU and an associated sequence number and constructs a PDCP header based on the PDCP sequence number. The PDCP header is attached to the PDCP SDU and forwarded to the UE 104 in step 1002.

Not shown in FIG. 10, the UE 104 receiving the message 1002 processes the received message according to the PDCP protocol and determines that the PDCP SDU contained in the message 1002 includes an SDAP header which was generated by the source eNodeB 101. Having determined that the PDCP SDU includes an SDAP header, the UE 104 processes the message in accordance with the SDAP protocol. In the embodiment illustrated in FIG. 10, the UE 104 therefore maintains its SDAP entity (which was established in the source cell prior to handover) after the UE 104 has changed its serving cell.

In some embodiments, the UE 104 removes its SDAP entity based on a determination that no further packets are likely to be received which include an SDAP header. This determination may be based on signalling, such as radio resource control (RRC) signalling, received from target eNodeB 102.

Alternatively, the determination may be made responsive to the expiry of a timer which is started during the handover execution step. The duration of the timer may be according to a specification, or may be configured by the network, for example in an RRC reconfiguration message transmitted by either the source eNodeB 101 or the target eNodeB 102.

The eNodeB 102 may receive a packet directly from the EPC such as the IP packet 1003. This is processed in the conventional manner by generating a PDCP header in accordance with the PDCP protocol, and is forwarded as shown in step 1004 to the UE 104, compliant with the format illustrated in 304 of FIG. 3B.

As an alternative to the sequence shown in FIG. 10, the eNodeB A 101 may have an IP packet for which no PDCP sequence number has yet been determined. In some embodiments, this may be forwarded directly to the target eNodeB 102 without a PDCP sequence number and without an SDAP header. The target eNodeB 102 assigns a PDCP sequence number and constructs the PDCP header and forwards the resulting message to UE 104.

This approach, as illustrated in FIG. 10, has the benefit that the target eNodeB 102 does not need to be upgraded to be able to process forwarded messages which include an SDAP header. Even though such messages are received by the target eNodeB 102 (such as message 1001), the target eNodeB 102 processes these in accordance with conventional procedures for the receipt of forwarded packets which comprise a PDCP SDU and are associated with a PDCP sequence number.

In some embodiments the UE 104 may, on receipt of a message transmitted from the target eNodeB 102 following a handover, make a determination as to whether or not the received message includes an SDAP header and, responsive to that determination, process the received message accordingly. In the case where it determines that the SDAP header is included, it removes the SDAP header before passing the IP packet to higher protocol layers. In the case where the message is determined not to include an SDAP header, the UE 104 processes that in accordance the conventional approach for packets received from the target eNodeB 102 which have been transmitted to the eNodeB 102 by the EPC core network 106 such as packets 1003 and 1004.

In another example embodiment, the source eNodeB 101 determines that a packet has not been successfully transmitted to the UE 104 and determines a corresponding sequence number according to a transport protocol used between the eNodeB 101 and 5G core network. The transport protocol may be a General Packet Radio Service (GPRS) Tunnelling Protocol (GTP) protocol and the sequence number may be a GTP sequence number. The source eNodeB 101 then indicates to the 5G core network 105 one of i) the sequence number(s) of packet(s) which have not been transmitted to the UE and ii) the sequence number of the last GTP packet (that is, the GTP packet with the highest sequence number) that has been transmitted to the UE 104. This indication may be communicated to the 5G core network 105 by means of a signalling message (which may be a GTP control protocol data unit or an S1 message sent on an S1 control plane) or by means of a last transmitted sequence number header field in a GTP packet which is transmitted from the source eNodeB 101 to the 5G core network 105.

Based on this message, the 5G core network 105 forwards the relevant packets to the EPC for onward forwarding to the target eNodeB 102 and the UE 104 in the target cell.

In addition, in some embodiments a control plane entity in one of the core networks 105, 106 (which may be a mobility management entity, MME, or an AMF) transmits an indication of the sequence number(s) of GTP packets for which data forwarding is required to a serving gateway (S-GW) or entity performing similar functionality.

As will be appreciated by the skilled person, various combinations of the embodiments described above are possible. For example, with reference to FIG. 4, embodiments described above which relate to the handover preparation phase 401 may be combined with embodiments described above which relate to data forwarding steps 403 and 404 and the corresponding processing of data.

Various aspects and features of the present technique are defined in the appended claims. Various modifications may be made to the example embodiments as disclosed above as appreciated by the skilled person within the scope of the appended claims. Various further example embodiments and features are defined in the following numbered paragraphs:

Paragraph 1. A method performed in a first infrastructure equipment for a handover of a wireless communications device from the first infrastructure equipment as a source to a second infrastructure equipment as a target, the method comprising
  maintaining a mapping between a plurality of packet bearers and a data radio bearer for the wireless communications device, each of the plurality of packet bearers being configured to provide a specified quality of service,
  determining that the wireless communications device should handover from the first infrastructure equipment to the second infrastructure equipment,
  determining that the second infrastructure equipment does not support the mapping of the plurality of packet bearers to the data radio bearer, and
  providing an indication of a mapping of the plurality of packet bearers for the second infrastructure equipment after handover to one of a core network equipment and the second infrastructure equipment for configuration of at least one of the radio bearer and the plurality of packet bearers at the second infrastructure equipment after the handover.

Paragraph 2. A method according to paragraph 1, wherein the providing an indication of a mapping of the plurality of packet bearers for the second infrastructure equipment after handover includes
  providing an indication of the mapping between the plurality of packet bearers and the data radio bearer for the wireless communications device maintained by the first infrastructure device.

Paragraph 3. A method according to paragraph 1, the method comprising:
  receiving from the core network equipment an indication of a mapping of the plurality of packet bearers to one or more packet bearers for the second infrastructure equipment after handover, and
  wherein the providing an indication of a mapping of the plurality of packet bearers for the second infrastructure equipment after handover includes
  providing an indication of the mapping from the plurality of packet bearers to the one or more packet bearers for the second infrastructure equipment after handover.

Paragraph 4. A method according to any of paragraphs 1 to 3, wherein the providing the indication of the required mapping of the plurality of packet bearers to a corresponding plurality of data radio bearers for the second infrastructure equipment after handover includes
  generating a signalling message for transmission to the core network equipment to which the first infrastructure equipment is connected, the signalling message indicating that the second infrastructure equipment does not support the mapping of the plurality of packet bearers to the data radio bearer, and
  sending the signalling message to the core network equipment in preparation for the handover.

Paragraph 5. A method according to paragraph 4 wherein the signalling message provides an indication of the mapping of a plurality of radio bearers to the plurality of packet bearers for configuring the second infrastructure equipment via an interface between the second infrastructure equipment and a second core network to which the second infrastructure equipment is connected.

Paragraph 6. A method according to paragraphs 1 or 2, wherein the providing the indication of the mapping of the plurality of packet bearers for the second infrastructure equipment after handover includes
  generating a transparent container for transmission to the second infrastructure equipment, the transparent container including a representation of the mapping, and
  transmitting the transparent container to the second infrastructure equipment.

Paragraph 7. A method according to paragraph 4, wherein the transparent container is transmitted to the second infrastructure equipment from the first infrastructure equipment via an interface between the first infrastructure equipment and the second infrastructure equipment.

Paragraph 8. A method performed in a first infrastructure equipment not supporting a mapping of a plurality of packet bearers to a data radio bearer for a handover of a wireless communications device from a second infrastructure equipment as a source to the first infrastructure equipment as a target, the method comprising
  receiving a request for the handover of the wireless communication device,
  receiving an indication of a mapping of a plurality of packet bearers for configuration of at least one of a radio bearer and a plurality of packet bearers after the handover,
  configuring a radio bearer for the wireless communications device based on the indication of the mapping of the plurality of packet bearers, generating a message indicating the configuration of the reserved radio bearer for transmission to the wireless communication device.

Paragraph 9. A method of paragraph 8, wherein the message indicating the configuration of the reserved radio bearer for transmission to the wireless communication device includes a mapping between the radio bearer and a packet bearer.

Paragraph 10. A method of paragraph 8 or paragraph 9, wherein the message indicating the configuration of the reserved radio bearer for transmission to the wireless communication device includes a mapping between the radio bearer and at least one of the plurality of packet bearers.

Paragraph 11. A method of paragraph 9, wherein the mapping between the radio bearer and at least one of the plurality of packet bearers is a mapping of all of the plurality of packet bearers to the radio bearer.

Paragraph 12. A method of any of paragraphs 8 to 11 wherein the indication of a mapping of a plurality of packet bearers for configuration of at least one of a radio bearer and a plurality of packet bearers after the handover is received in a transparent container generated by the second infrastructure equipment.

Paragraph 13. A method of paragraph 12, comprising
determining that the transparent container does not comply with one or more predetermined requirements, and
responsive to the determination, configuring the radio bearer without regards to a configuration of a radio bearer by the second infrastructure equipment.

Paragraph 14. An infrastructure equipment forming a radio network part of a wireless communications network, configured to transmit data to and/or receive data from a wireless communications device, and to transmit the data to or receive the data from a core network part of the wireless communications network, the infrastructure equipment comprising
receiver circuitry configured to receive radio signals transmitted by the wireless communications device via a wireless access interface,
transmitter circuitry configured to transmit radio signals to the wireless communications device via the wireless access interface, and
controller circuitry configured to control the transmitter circuitry and the receiver circuitry to transmit data to or receive data from the wireless communications device and to transmit the data to or receive the data from the core network via an interface with the core network, wherein the controller circuitry is configured to
to maintain a mapping between a plurality of packet bearers and a data radio bearer for the wireless communications device, each of the plurality of packet bearers being configured to provide a specified quality of service,
to determine that the wireless communications device should handover from the first infrastructure equipment to a second infrastructure equipment,
to determine that the second infrastructure equipment does not support the mapping of the plurality of packet bearers to the data radio bearer, and the controller is configured in combination with the transmitter circuitry
to transmit an indication of a mapping of the plurality of packet bearers for the second infrastructure equipment after handover to the core network equipment for configuration of at least one of the radio bearer and the plurality of packet bearers at the second infrastructure equipment after the handover.

Paragraph 15. An infrastructure equipment forming a radio network part of a wireless communications network, configured to transmit data to and/or receive data from a wireless communications device, and to transmit the data to or receive the data from a core network part of the wireless communications network, the infrastructure equipment comprising
receiver circuitry configured to receive radio signals transmitted by the wireless communications device via a wireless access interface,
transmitter circuitry configured to transmit radio signals to the wireless communications device via the wireless access interface, and
controller circuitry configured to control the transmitter circuitry and the receiver circuitry to transmit data to or receive data from the wireless communications device and to transmit the data to or receive the data from the core network via an interface with the core network, wherein the controller circuitry is configured
to receive a request for a handover of the wireless communication device,
to receive an indication of a mapping of a plurality of packet bearers for configuration of at least one of a radio bearer and a plurality of packet bearers after the handover,
to configure a radio bearer for the wireless communications device based on the indication of the mapping of the plurality of packet bearers and
to generate a message indicating the configuration of the reserved radio bearer for transmission to the wireless communication device,
wherein the infrastructure equipment does not support a mapping of a plurality of packet bearers to a data radio bearer.

Paragraph 16. A method for forwarding data received by a first infrastructure equipment acting as a source to a second infrastructure equipment acting as a target for a wireless communications device during handover, the method comprising:
receiving first data for transmission to the wireless communications device from a core network to which the first infrastructure equipment is connected,
generating a first protocol data unit according to a first protocol, the protocol data unit including the received first data and a first protocol header,
determining that the wireless communications device has performed the handover,
in response to determining that the wireless device has performed the handover, transmitting the received first data to a second infrastructure equipment for transmission to the wireless communications device
wherein the first protocol provides a mapping of a plurality of packet bearers, configured to provide a specified quality of service, to a data radio bearer.

Paragraph 17. A method according to paragraph 16, further comprising
determining a sequence number in accordance with a second protocol,
generating a second protocol data unit in accordance with the second protocol, the second protocol data unit including the first protocol data unit and the sequence number, transmitting the second protocol data unit to the wireless communications device.

Paragraph 18. A method according to paragraph 16, comprising
determining a sequence number in accordance with a second protocol,
transmitting the sequence number to the second infrastructure equipment.

Paragraph 19. A method according to paragraph 16, comprising
determining a sequence number in accordance with a second protocol,
wherein transmitting the received data to a second infrastructure equipment for transmission to the wireless device comprises transmitting the first protocol data unit together with the sequence number to the second infrastructure equipment.

Paragraph 20. A method according to any of paragraphs 16 to 19, comprising
receiving second data for transmission to a wireless communications device from a core network,
generating a third protocol data unit according to the first protocol, the third protocol data unit including the received second data and a header in accordance with the first protocol,
generating a fourth protocol data unit in accordance with the second protocol, the fourth protocol data unit including the third protocol data unit and a sequence number in accordance with the second protocol,
before determining that the wireless communications device has performed a handover, transmitting the second protocol data unit to the wireless communications device.

Paragraph 21. An infrastructure equipment forming a radio network part of a wireless communications network, configured to transmit data to and/or receive data from a wireless communications device, and to transmit the data to or receive the data from a core network part of the wireless communications network, the infrastructure equipment comprising
receiver circuitry configured to receive radio signals transmitted by the wireless communications device via a wireless access interface,
transmitter circuitry configured to transmit radio signals to the wireless communications device via the wireless access interface, and
controller circuitry configured to control the transmitter circuitry and the receiver circuitry to transmit data to or receive data from the wireless communications device and to transmit the data to or receive the data from the core network via an interface with the core network, wherein the controller circuitry is configured
to receive first data for transmission to the wireless communications device from the core network equipment,
to generate a first protocol data unit according to a first protocol, the protocol data unit including the received first data and a first protocol header,
to determine that the wireless communications device has performed the handover, and
in response to determining that the wireless device has performed the handover, to transmit the received first data to a second infrastructure equipment for transmission to the wireless communications device, and the first protocol provides a mapping of a plurality of packet bearers, configured to provide a specified quality of service, to a data radio bearer.

Paragraph 22. A method for transmitting data to a wireless device by a second infrastructure equipment acting as a target after handover from a first infrastructure equipment acting as a source, the method comprising
receiving data for transmission to the wireless communications device, the data including a first portion comprising a header according to a first protocol, a second portion comprising a header according to a second protocol, and a third portion,
receiving a sequence number associated with the data according to the second protocol,
transmitting the third portion to the wireless communications device, wherein the data is received from the first infrastructure device.

Paragraph 23 An infrastructure equipment forming a radio network part of a wireless communications network, configured to transmit data to and/or receive data from a wireless communications device, and to transmit the data to or receive the data from a core network part of the wireless communications network, the infrastructure equipment comprising
receiver circuitry configured to receive radio signals transmitted by the wireless communications device via a wireless access interface,
transmitter circuitry configured to transmit radio signals to the wireless communications device via the wireless access interface, and
controller circuitry configured to control the transmitter circuitry and the receiver circuitry to transmit data to or receive data from the wireless communications device and to transmit the data to or receive the data from the core network via an interface with the core network, wherein the controller circuitry is configured
to receive data for transmission to the wireless communications device, the data including a first portion comprising a header according to a first protocol, a second portion comprising a header according to a second protocol, and a third portion,
to receive a sequence number associated with the data according to the second protocol, and the controller is configured to transmit the third portion to the wireless communications device, and the data is received from source infrastructure equipment of the radio network part of the wireless communications network.

Paragraph 24. A method of receiving data by a wireless communications device in a wireless network during handover from a first infrastructure equipment acting as a source to a second infrastructure equipment acting as a target, the method comprising:
receiving by the wireless communications device first data in a first network cell from a first infrastructure equipment, the first data comprising a first data portion received by the first infrastructure equipment from a first core network and a first protocol header in accordance with a first protocol and a second protocol header in accordance with a second protocol, the second protocol header including a sequence number, the first and second protocol headers being generated by the first infrastructure equipment,
performing a handover to a second cell associated with a second infrastructure equipment, the second infrastructure equipment connected to a second core network different from the first core network, receiving a second data in the second network cell, the second data comprising a second data portion, determining whether the second data includes a third protocol header in accordance with the first protocol;

if the second data includes the third protocol header in accordance with the first protocol, removing the third protocol header before processing the second data in accordance with the second protocol;

receiving third data in the second network cell, the third data comprising a third data portion received by the second infrastructure equipment from the second core network and a header in accordance with the second protocol, the second protocol header including a sequence number generated by the second infrastructure equipment.

25. A method according to paragraph 24, wherein the second infrastructure equipment is an eNodeB connected to an enhanced packet core, EPC, network and the receiving the second data includes receiving the second data from the second infrastructure equipment, which has been received from a 5G core network.

Paragraph 26. A method according to paragraph 24 or 25, wherein the second protocol is associated with a radio bearer and provides one or more of header compression, security, and retransmission of the second data.

Paragraph 27. A method according to paragraph 26, wherein the second protocol is a packet data convergence protocol (PDCP).

Paragraph 28. A method according to paragraph 24, wherein the receiving the second data includes receiving the second data from the second infrastructure equipment, which has been received by the second infrastructure equipment via an interface between the first infrastructure equipment and the second infrastructure equipment.

Paragraph 29. A method according to paragraph 24, wherein the receiving by the wireless communications device the first data in the first network cell from a first infrastructure equipment includes receiving the first data from the first core network using an internet protocol, IP, packet.

Paragraph 30. A method according to any of paragraphs 24 to 29, wherein the first protocol provides a mapping of a plurality of packet bearers, configured to provide a specified quality of service, to a data radio bearer.

Paragraph 31. A communications device configured to transmit radio signals to and/or receive radio signals from a first infrastructure equipment and a second infrastructure equipment of a wireless communications network, the communications device comprising a receiver circuit configured to receive radio signals transmitted by the first and second infrastructure equipment via a wireless access interface, a transmitter circuit configured to transmit radio signals to the first and second infrastructure equipment via the wireless access interface, and a controller circuit configured to control the transmitter circuit and the receiver circuit to transmit data to or receive data from the wireless communications network via the first and second infrastructure equipment, wherein the controller circuit is configured to control the receiver circuit to receive first data in a first network cell from the first infrastructure equipment, the first data comprising a first data portion received by the first infrastructure equipment from a first core network and a first protocol header in accordance with a first protocol and a second protocol header in accordance with a second protocol, the second protocol header including a sequence number, the first and second protocol headers being generated by the first infrastructure equipment, to perform a handover to a second cell associated with the second infrastructure equipment, the second infrastructure equipment connected to a second core network different from the first core network, to receive a second data in the second network cell, the second data comprising a second data portion, the controller configured to determine whether the second data includes a third protocol header in accordance with the first protocol, and, if the second data includes the third protocol header in accordance with the first protocol, to remove the third protocol header before processing the second data in accordance with the second protocol; and the controller circuit is configured to control the receiver circuit to receive third data in the second network cell, the third data comprising a third data portion received by the second infrastructure equipment from the second core network and a header in accordance with the second protocol, the second protocol header including a sequence number generated by the second infrastructure equipment.

Paragraph 32. A communications device according to paragraph 31, wherein the second infrastructure equipment is an eNodeB connected to an enhanced packet core, EPC, network and the second data has been received by the second infrastructure equipment from a 5G core network.

Paragraph 33. A communications device according to paragraph 31 or 32, wherein the second protocol is associated with a radio bearer and provides one or more of header compression, security, and retransmission of the second data.

Paragraph 34. A communications device according to paragraph 33, wherein the second protocol is a packet data convergence protocol (PDCP).

Paragraph 35. A communications device according to paragraph 31, wherein the second data has been received by the second infrastructure equipment via an interface between the first infrastructure equipment and the second infrastructure equipment.

Paragraph 36. A communications device according to paragraph 31, wherein the first data comprises an internet protocol, IP, packet.

Paragraph 37. A communications device according to any of paragraphs 31 to 36, wherein the first protocol provides a mapping of a plurality of packet bearers, configured to provide a specified quality of service, to a data radio bearer.

REFERENCES

[1] LTE for UMTS: OFDMA and SC-FDMA Based Radio Access, Harris Holma and Antti Toskala, Wiley 2009, ISBN 978-0-470-99401-6.
[2] 3GPP TS 36.331
[3] 3GPP TS 38.300

What is claimed is:

1. A method performed by a wireless communications device for handover from a first infrastructure equipment to a second infrastructure equipment, the method comprising:
maintaining a data radio bearer between the wireless communications device and the first infrastructure equipment, the data radio bearer being mapped to quality of service (QOS) flows between the wireless communications device and the first infrastructure equipment via a first mapping, each of the QoS flows being configured to provide a specified quality of service; and
receiving a handover command from the second infrastructure equipment via the first infrastructure equipment,
wherein the wireless communications device connects to the second infrastructure equipment via at least one second radio bearer, and the at least one second radio bearer is mapped to the QoS flows via a second mapping that is different from the first mapping.

2. The method according to claim 1, wherein the mapping of the QoS flows to the at least one second radio bearer according to the second mapping is used after handover of the wireless communications device to the second infrastructure equipment.

3. The method according to claim 1, wherein the second infrastructure equipment receives parameters corresponding to the second mapping of the QoS flows to the at least one second radio bearer from the first infrastructure equipment.

4. The method according to claim 3, wherein the second infrastructure equipment receives the parameters from the second infrastructure equipment via an interface between the first infrastructure equipment and the second infrastructure equipment.

5. The method according to claim 4, wherein the interface is an X2 interface.

6. The method according to claim 1, further comprising:
generating, by the wireless communications device, at least one of measurement reports or signal strength measurements,
wherein determination that the wireless device should handover to the second infrastructure equipment is based on the at least one of the measurement reports or signal strength measurements.

7. The method according to claim 3, wherein the parameters include parameters corresponding to the first mapping between the QoS flows and the data radio bearer maintained between the first infrastructure equipment and the wireless communications device.

8. A wireless communications device, comprising:
circuitry configured to
maintain a data radio bearer to a first infrastructure equipment, the data radio bearer being mapped to quality of service (QOS) flows between the wireless communications device and the first infrastructure equipment via a first mapping, each of the QoS flows being configured to provide a specified quality of service; and
receive a handover command from a second infrastructure equipment via the first infrastructure equipment,
wherein the wireless communications device connects to the second infrastructure equipment via at least one second radio bearer, and the at least one second radio bearer is mapped to the QoS flows via a second mapping that is different from the first mapping.

9. The wireless communications device according to claim 8, wherein the mapping of the QoS flows to the at least one second radio bearer according to the second mapping is used after handover of the wireless communications device to the second infrastructure equipment.

10. The wireless communications device according to claim 8, wherein the second infrastructure equipment receives parameters corresponding to the second mapping of the QoS flows to the at least one second radio bearer from the first infrastructure equipment.

11. The wireless communications device according to claim 10, wherein the second infrastructure equipment receives the parameters from the second infrastructure equipment via an interface between the first infrastructure equipment and the second infrastructure equipment.

12. The wireless communications device according to claim 11, wherein the interface is an X2 interface.

13. The wireless communications device according to claim 8, wherein the circuitry is further configured to
generate at least one of measurement reports or signal strength measurements, and
wherein determination that the wireless device should handover to the second infrastructure equipment is based on the at least one of the measurement reports or signal strength measurements.

14. The wireless communications device according to claim 10, wherein the parameters include parameters corresponding to the first mapping between the QoS flows and the data radio bearer maintained between the first infrastructure equipment and the wireless communications device.

* * * * *